US007683805B2

(12) United States Patent
Amano

(10) Patent No.: US 7,683,805 B2
(45) Date of Patent: Mar. 23, 2010

(54) TRAFFIC SITUATION DISPLAY DEVICE, METHOD AND PROGRAM THEREOF AND RECORDING MEDIUM WITH THE PROGRAM RECORDED THEREIN

(75) Inventor: Kouji Amano, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 421 days.

(21) Appl. No.: 11/630,520

(22) PCT Filed: Jun. 27, 2005

(86) PCT No.: PCT/JP2005/011721

§ 371 (c)(1), (2), (4) Date: Dec. 21, 2006

(87) PCT Pub. No.: WO2006/001414

PCT Pub. Date: Jan. 5, 2006

(65) Prior Publication Data

US 2007/0273555 A1 Nov. 29, 2007

(30) Foreign Application Priority Data

Jun. 25, 2004 (JP) ............................ 2004-188699

(51) Int. Cl.
*G08G 1/01* (2006.01)

(52) U.S. Cl. .................... 340/935; 340/995.1; 340/901; 340/992

(58) Field of Classification Search ................. 340/935, 340/988–990, 995.1, 995.12, 995.13, 901, 340/995.19, 934, 991, 995.2, 994, 992; 701/1, 701/117, 200, 207–208, 211, 118, 23–24
See application file for complete search history.

(56) References Cited

U.S. PATENT DOCUMENTS

| | | | | |
|---|---|---|---|---|
| 5,257,023 | A * | 10/1993 | Furuya | 340/995.13 |
| 5,831,552 | A * | 11/1998 | Sogawa et al. | 340/995.27 |
| 6,810,328 | B2 * | 10/2004 | Yokota et al. | 701/210 |
| 7,100,825 | B2 * | 9/2006 | Levine | 235/384 |
| 7,382,274 | B1 * | 6/2008 | Kermani et al. | 340/901 |
| 2002/0035430 | A1 * | 3/2002 | Yano et al. | 701/209 |
| 2003/0033078 | A1 * | 2/2003 | Kita et al. | 701/117 |
| 2005/0231393 | A1 * | 10/2005 | Berger et al. | 340/995.13 |

FOREIGN PATENT DOCUMENTS

| | | |
|---|---|---|
| JP | 4-122815 | 4/1992 |
| JP | 7-65287 | 3/1995 |
| JP | 9-113290 | 5/1997 |
| JP | 10-504102 | 4/1998 |

(Continued)

*Primary Examiner*—Daniel Previl
(74) *Attorney, Agent, or Firm*—Kratz, Quintos & Hanson, LLP

(57) ABSTRACT

A processor 180 of a navigation device 100 acquires current position information about a current position of a vehicle. The processor 180 then generates current traffic-jam information about a current traffic-jam condition based on VICS data from a VICS receiver 120 or the like. The processor 180 recognizes a direction indicating a point at which a traffic jam is currently occurring relative to the current position based on current position information and current traffic-jam information. The processor 180 displays the recognized direction with a traffic-jam direction icon on a terminal display section 140.

21 Claims, 13 Drawing Sheets

FOREIGN PATENT DOCUMENTS

| | | |
|---|---|---|
| JP | 10-227648 | 8/1998 |
| JP | 11-83506 | 3/1999 |
| JP | 2001-304895 | 10/2001 |
| JP | 2001-331492 | 11/2001 |
| JP | 2003-151079 | 5/2003 |
| JP | 2003-317197 | 11/2003 |
| JP | 2004-132737 | 4/2004 |
| JP | 2004-132897 | 4/2004 |

* cited by examiner

FIG. 4

TRAFFIC-JAM PREDICTION TABLE

| DATE CLASSIFICATION | WORKDAY | SATURDAY | SUNDAY/ LEGAL HOLIDAY | SPECIAL DAY 1 | SPECIAL DAY 2 | . . . | DAY BEFORE LONG HOLIDAY | FIRST DAY OF LONG HOLIDAY | MIDDLE DAY OF LONG HOLIDAY | LAST DAY OF LONG HOLIDAY | DAY BEFORE LAST DAY OF LONG HOLIDAY |
|---|---|---|---|---|---|---|---|---|---|---|---|
| DATE-CLASSIFICATION ID | ID1 | ID2 | ID3 | ID4 | ID5 | ID6 | ID7 | ID8 | ID9 | ID10 | ID11 |
| 11 | TIME-SERIES DATA . . . | TIME-SERIES DATA . . . | . . . | . . . | . . . | . . . | . . . | . . . | . . . | . . . | . . . |

| SUNDAY | MONDAY | TUESDAY | WEDNESDAY | THURSDAY | FRIDAY | SATURDAY |
|---|---|---|---|---|---|---|
| | 1 ID1 | 2 ID1 | 3 ID1 | 4 ID1 | 5 ID1 | 6 ID2 |
| 7 ID3 | 8 ID1 | ... | ... | ... | ... | ... |
| ... | ... | ... | ... | ... | ... | ... |
| ... | ... | ... | ... | ... | ... | ... |
| 28 ID3 | 29 ID1 | 30 ID1 | 31 ID1 | | | |

3302
3301
312
311
310
300
3303
3304

TRAFFIC SITUATION DISPLAY DEVICE, METHOD AND PROGRAM THEREOF AND RECORDING MEDIUM WITH THE PROGRAM RECORDED THEREIN

TECHNICAL FIELD

The present invention relates to a traffic-condition display device for displaying map information on a display unit in accordance with travel of a mobile body, its method, its program, and a recording medium storing the program.

BACKGROUND ART

There has been known an in-vehicle navigation device that acquires traffic information (VICS data) on traffic conditions such as traffic accidents and traffic jams from a Vehicle Information Communication System (VICS) and superimposes indications representing the traffic conditions such as the traffic accidents and the traffic jams on map information displayed on a display screen of a display unit to notify a user of the traffic conditions. In many cases, when a traffic jam occurs, drivers who are avoiding the traffic-jam might cause a secondary traffic jam on the roads around the original traffic-jam. The traffic condition notified based on the VICS data represents the current condition, and therefore the drivers avoiding the traffic jam based on the notified current traffic condition might be caught in the secondary traffic jam. Thus, there is a demand for improved navigation devices that can navigate drivers to travel more smoothly.

Meanwhile, as an in-vehicle navigation device, there has been known an arrangement that predicts and notifies current and future traffic conditions with the use of statistical traffic-jam information data obtained by statistically processing the past traffic-jam information (see, for example, Patent Document 1). The in-vehicle navigation device disclosed in Patent document 1 notifies statistical traffic-jam information according to time factors such as time and day of the week based on the statistical traffic-jam information data by superimposing the information on map information in various expressions corresponding to traffic-jam conditions. With the notified time and day of the week, users can predict current and possible future traffic jams.

[Patent Document 1] Japanese Laid-Open Patent Publication No. Hei 9-113290 (right column of page 3 to left column of page 7).

DISCLOSURE OF THE INVENTION

Problems to be Solved by the Invention

In the navigation device disclosed in Patent Document 1, a traffic-jam direction mark that indicates a traffic jam is displayed in the vicinity of a road displayed in the map information. Accordingly, the display becomes complicated, which might make it difficult for the users to recognize a traffic-jam point.

An object of the present invention is to provide a traffic-condition display device capable of displaying a traffic condition of a mobile body, its method, its program, and a recording medium storing the program.

Means for Solving the Problems

A traffic-condition display device according to an aspect of the present invention, includes: a current position information acquirer for acquiring current position information about a current position of a mobile body; a traffic information acquirer for acquiring traffic information about a traffic condition; a particular-condition-point direction recognizer for recognizing a direction indicating a point in a particular traffic condition relative to the current position; and a display controller for performing control to display the direction indicating the point in the particular traffic condition relative to the current position on a display unit.

According to another aspect of the present invention, a traffic-condition display method that is performed by a computing unit for displaying a traffic condition on a display unit includes: acquiring current position information about a current position of a mobile body; acquiring traffic information about a traffic condition; recognizing a direction indicating a point in a particular traffic condition relative to the current position; and performing control to display the direction indicating the point in the particular traffic condition relative to the current position on the display unit.

According to still another aspect of the present invention, a traffic-condition display program operates a computing unit as the above-described traffic-condition display device of the present invention.

According to yet another aspect of the present invention, a traffic-condition display program operates a computing unit to execute the above-described traffic-condition display method of the present invention.

According to further aspect of the present invention, a recording medium stores the above-described traffic-condition display program of the present invention in a manner readable by a computing unit.

BRIEF DESCRIPTION OF DRAWINGS

FIG. 4 is a conceptual diagram schematically showing a table structure of data in a traffic-jam prediction table according to the embodiment;

FIG. 5 is a conceptual diagram schematically showing a table structure of data in a calendar template according to the embodiment;

EXPLANATION OF CODES

Figure 1:
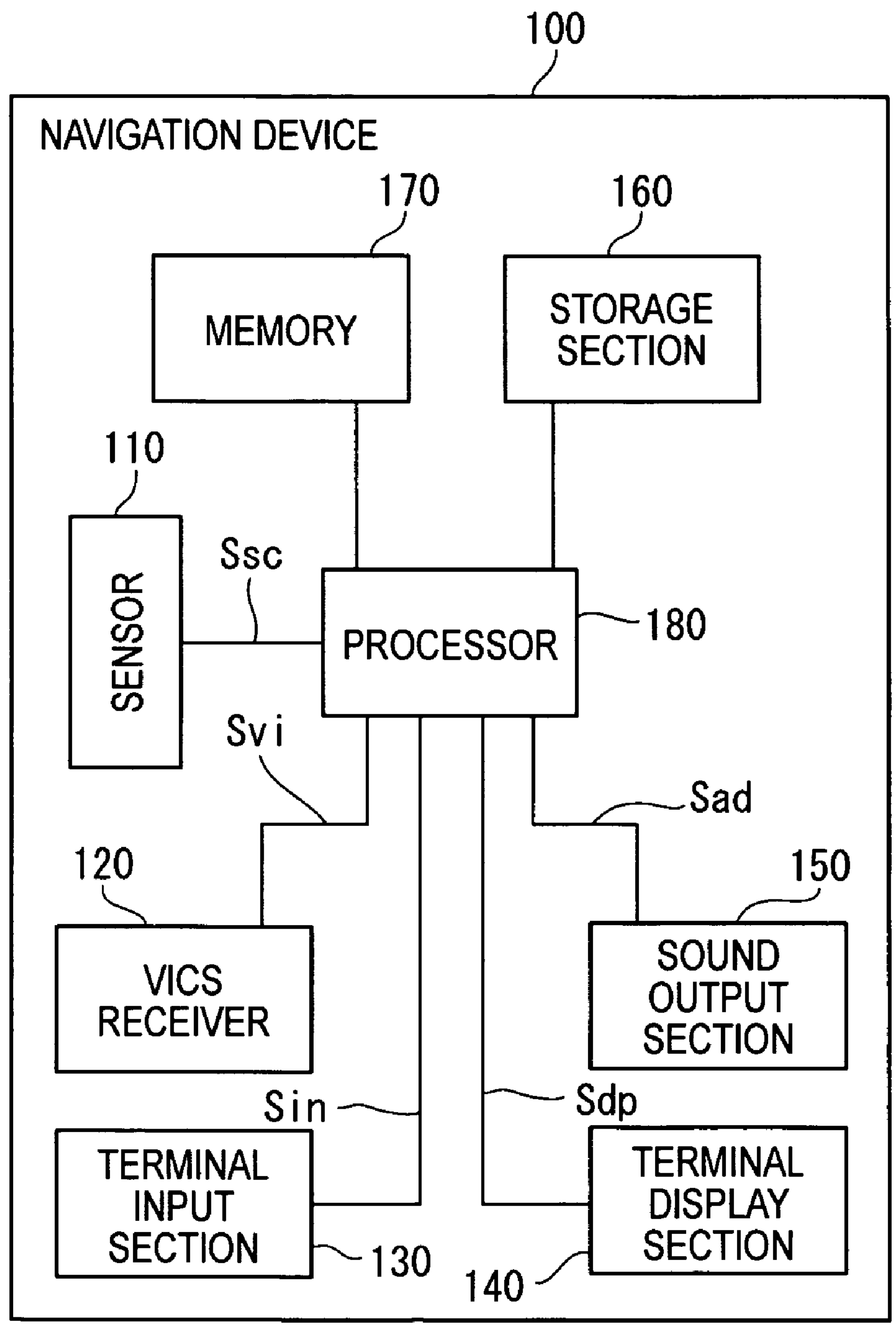
FIG. 1 is a block diagram schematically showing an arrangement of a navigation device according to an embodiment of the present invention.

**12*i***: time-series data as traffic information
100: navigation device as traffic-condition display device
110: sensor as travel direction recognizer of computing unit
120: VICS receiver as traffic information acquirer of computing unit
140: terminal display section as display unit
181: current position recognizer as a current position information acquirer of computing unit
182: destination recognizer that can also function as destination information acquirer
184: display controller functioning as particular-condition-point direction recognizer and current-position map information acquirer of computing unit, the particular-condition-point direction recognizer also functioning as direction selecting signal acquirer and particular-condition-point map information acquirer
187: traffic-jam condition recognizer as traffic information acquirer that can also function as area-specifying signal acquirer of computing unit
188: route processor that can also function as map information acquirer and travel route setting section
300: display area
311: current-position map information
3221, 3222, 3223, 3224, 3225, 3226, 3227, 3228: traffic-jam direction icon as direction data
3301, 3302, 3303, 3304: traffic-jam direction display area as direction data

BEST MODE FOR CARRYING OUT THE INVENTION

An embodiment of the present invention will be described below with reference to the attached drawings.

A navigation device of the present embodiment is an example of a traffic-condition display device of the present invention, which is designed to navigate a mobile body (e.g. a vehicle) for driving as a travel progress thereof.

It should be noted that the traffic-condition display device of the present invention is not necessarily designed to navigate a vehicle for the driving thereof, but may be so designed to notify a traffic condition for any type of mobile body. In addition, the traffic-condition display device may be a portable unit that can be carried by a user.

[Arrangement of Navigation Device]

Referring to FIG. 1, the reference numeral 100 denotes the navigation device as the traffic-condition display device. The navigation device 100 notifies guidance on a travel along with a travel progress of a mobile body (e.g. a vehicle). The mobile body is not limited to vehicles, but includes any type of mobile body such as aircrafts and ships. The navigation device 100 may be, for example, an in-vehicle unit installed in a vehicle as a mobile body, a portable unit, a PDA (Personal Digital Assistant), a portable phone, a PHS (Personal Handy-phone System) or a portable personal computer. The navigation device 100 searches for and displays information about a current position and a destination, a route to the destination, predetermined shops nearby, and information about services offered by the shops based on map information stored in the navigation device 100. As shown in FIG. 1, the navigation device 100 has a sensor 110 (travel direction recognizer), a VICS (Vehicle Information Communication System) receiver 120 (traffic information acquirer), a terminal input section 130, a terminal display section 140 (display unit), a sound output section 150, a storage section 160, a memory 170, a processor 180 and so on.

The sensor 110 detects the travel progress of a mobile body (e.g. a vehicle), or the current position and the driving status, and outputs it as a predetermined signal Ssc to the processor 180. The sensor 110 typically has a GPS (Global Positioning System) receiver (not shown) and various sensors such as a speed sensor, an azimuth sensor and an acceleration sensor (each not shown).

The GPS receiver receives electric navigation waves output from a GPS satellite (not shown), which is an artificial satellite, via a GPS antenna (not shown). Then, the GPS receiver computes simulated coordinate values of the current position based on a signal corresponding to the received electric navigation waves and outputs the simulated coordinate values as GPS data to the processor 180.

The speed sensor of the sensor 110 is arranged on the mobile body (e.g. a vehicle) so as to detect driving speed and actual acceleration of the vehicle based on a signal that varies depending on driving speed of the vehicle. The speed sensor reads a pulse signal, a voltage value and the like output in response to the revolution of axles and wheels of the vehicle. Then, the speed sensor outputs speed detection information such as the read pulse signal and voltage value to the processor 180. The azimuth sensor is arranged on the vehicle and provided with a so-called gyro-sensor (not shown) so as to detect the azimuth of the vehicle, i.e., a driving direction for which the vehicle is heading. The azimuth sensor outputs driving direction information about the detected driving direction to the processor 180. The acceleration sensor is arranged on the vehicle so as to detect the acceleration of the vehicle in the driving direction thereof. The acceleration sensor converts the detected acceleration into a sensor output value, which is for instance the pulse and the voltage, and then outputs the sensor output value to the processor 180.

The VICS receiver 120 has a VICS antenna (not shown) and acquires information about the traffic via the VICS antenna. More specifically, the VICS receiver 120 acquires VICS data (traffic information) about traffic jams, traffic accidents, constructions, traffic controls and so on from the VICS (not shown) by way of a beacon, FM multiplex broadcasting or the like. The acquired information about traffic is output as a predetermined signal Svi to the processor 180.

The VICS data is structured in a table typically containing a plurality of following conceptual items formed as a single data structure.

traffic-jam level: traffic-jammed, crowded, smooth, etc.
top position information of traffic jam
length information of traffic jam
link travel time information: travel time required for a vehicle to pass through a VICS link (distance between intersections)
zone travel time information: travel time required for a vehicle to pass through a zone longer than a VICS link
information about traffic controls, causes thereof, controlled areas
information about availability of parking areas
information about service areas and parking areas
other information The terminal input section 130, which may be a keyboard, a mouse or the like, has various operation buttons and operation knobs (each not shown) to be used for input operations. The operation buttons and the operation knobs are used to input, for example, the settings for the operations of the navigation device 100. More specifically, the operation buttons and the operation knobs may be used: to set content of information to be acquired and acquiring criteria; to set a destination; to retrieve information; to set for display of the driving status (travel progress) of the vehicle; and to set for switching display. When the settings are input, the terminal input section 130 outputs a predetermined signal Sin to the processor 180 so as to apply the settings. In place of the input operation using the operation buttons and the operation knobs, the terminal input section 130 may employ input operation using a touch panel arranged on the terminal display section 140, sound input operation and the like for inputting various settings.

The terminal display section 140, under the control of the processor 180, displays a signal Sdp representing image data sent from the processor 180. Examples of the image data may include image data representing map information and retrieval information, TV image data received by a TV receiver, image data stored in an external device or recording medium such as an optical disc, a magnetic disc or a memory card and read by a drive or a driver, and image data in the memory 170. The terminal display section 140 may typically be a liquid-crystal display panel, an organic EL (Electro Luminescence) panel, a PDP (Plasma Display Panel), a CRT (Cathode-Ray Tube), an FED (Field Emission Display), or an electrophoretic display panel.

The sound output section 150 has an audio section such as a speaker (not shown). The sound output section 150, under the control of the processor 180, outputs various signals Sad as sounds from the audio section. The various signals Sad represent sound data etc. sent from the processor 180. Information output as sounds, which may be the driving direction and the driving status of the vehicle and traffic condition, are notified to occupants such as a driver of the vehicle for navigating the vehicle. The audio section may output TV sound data received by a TV receiver (not shown) and sound data stored in a recording medium or the memory 170. In place of the audio section provided to the sound output section 150, the sound output section 150 may use an audio section equipped on the vehicle.

Figure 2:
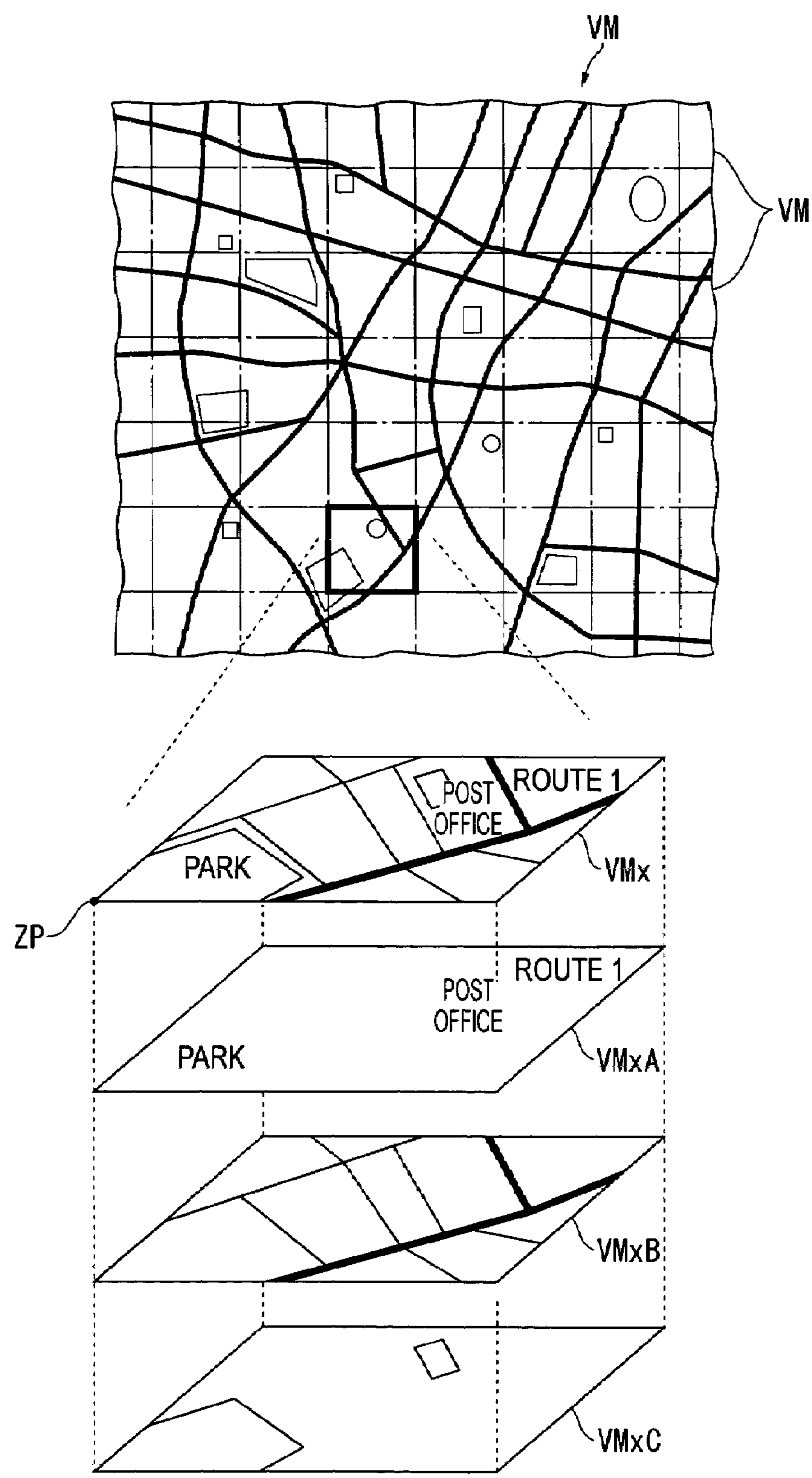
FIG. 2 is a conceptual diagram schematically showing a table structure of display data of map information according to the embodiment.
Figure 3:
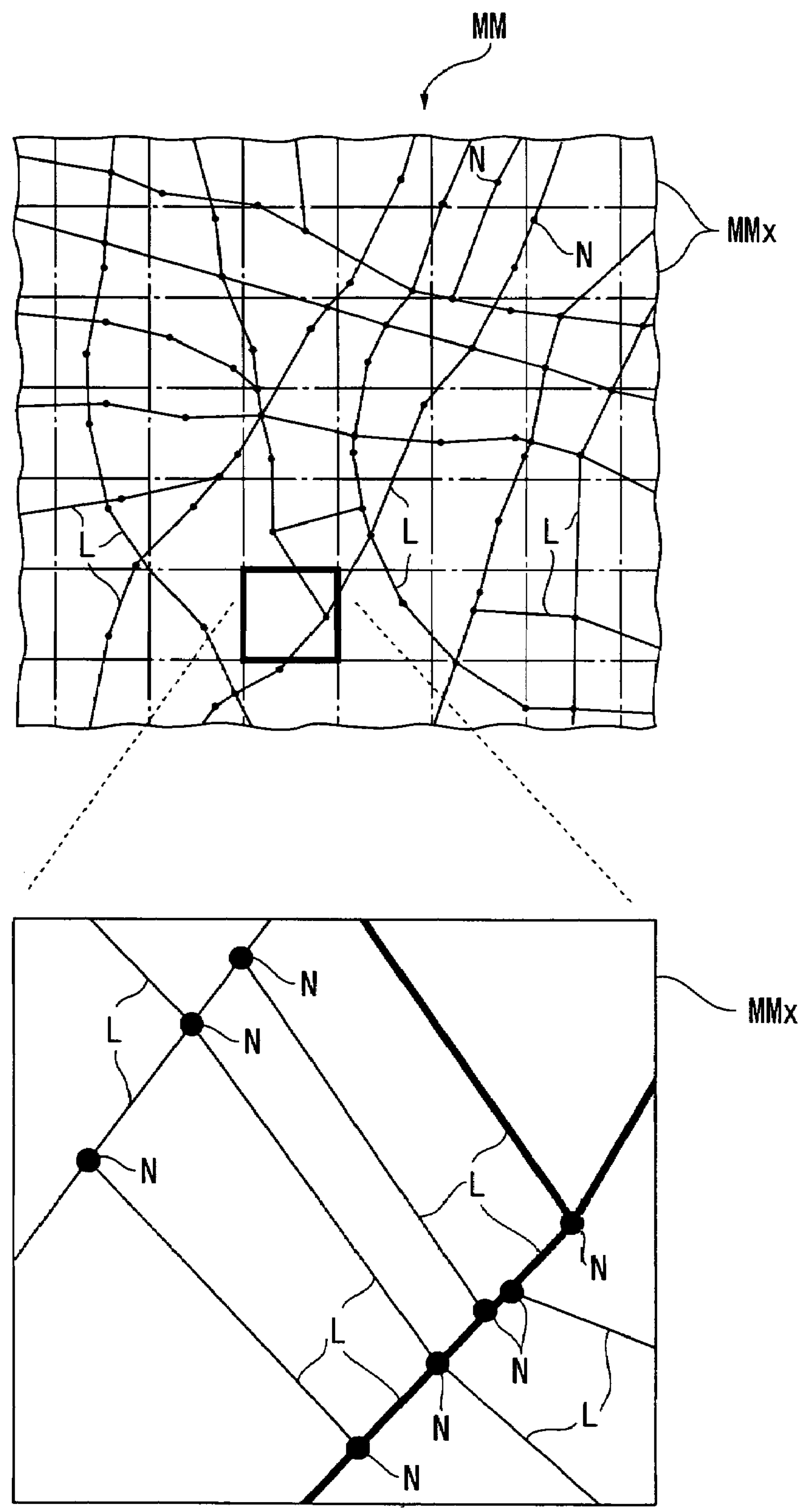
FIG. 3 is a conceptual diagram schematically showing a table structure of matching data of the map information according to the embodiment.

The storage section 160 readably stores map information as shown in FIGS. 2 and 3 and a traffic-jam prediction table 10 as shown in FIG. 4. Although not shown, the storage section 160 includes a map information storage area for storing the map information, a traffic-jam prediction table storage area for storing the traffic-jam prediction table 10 and the like. While the storage section 160 has the above-described two storage areas in the above description, the storage section 160 may not have any of the above-described storage areas, or may have additional storage areas. The storage section 160 may include drives or drivers for readably storing data on a recording medium such as a HD (Hard Disk), a DVD (Digital Versatile Disc), an optical disc and a memory card.

The map information includes display data VM, which is so-called POI (Point Of Interest) data as shown in FIG. 2, matching data MM as shown in FIG. 3, route-search map data and the like.

The display data VM includes, for example, plural pieces of display mesh information VMx, each having a unique number. To be more specific, the display data VM is divided into the plural pieces of display mesh information VMx, each relating to an area. The display data VM is constituted from the plural pieces of display mesh information VMx continuously arranged in a matrix form. The display mesh information VMx may be further divided into plural pieces of display mesh information VMx to be contained in a lower layer, each relating to a smaller area. Each display mesh information VMx has a rectangular shape with each side thereof having a predetermined length, which is reduced relative to the actual geographic length according to the map scale. A predetermined corner thereof contains absolute coordinates ZP in the whole map information, e.g., a global map.

The display mesh information VMx is, for instance, constituted from name information VMxA such as intersection names, road information VMxB and background information VMxC. The name information VMxA is data structured in a table for arranging and displaying miscellaneous element data (e.g. intersection name, town name) contained in an area at a predetermined position with reference to a positional relationship based on the absolute coordinates ZP. The road information VMxB is data structured in a table for arranging and displaying road element data (e.g. road) contained in an area at a predetermined position with reference to a positional relationship based on the absolute coordinates ZP. The background information VMxC is data structured in a table for arranging and displaying miscellaneous element data (e.g. mark and image information representing famous spots and buildings) at a predetermined position with reference to a positional relationship based on the absolute coordinates ZP.

The matching data MM, just like the display data VM, is divided into plural pieces of matching mesh information MMx, each having a unique number and relating to an area. The matching data MM is constituted from the plural pieces of matching mesh information MMx continuously arranged in a matrix form. The matching mesh information MMx may be further divided into plural pieces of matching mesh information MMx to be contained in a lower layer, each relating to a smaller area. Each matching mesh information MMx has a rectangular shape with each side thereof having a predetermined length, which is reduced relative to the actual geographic length according to the map scale. A predetermined corner thereof contains absolute coordinates ZP in the whole map information, e.g., a global map. The matching mesh information MMx and the display mesh information VMx may not necessarily represent the same area. That is, they may be divided according to different scales. If the same scale is used, unique number information may be used for associating the data. If a different scale is used, the absolute coordinates may be used for associating the data.

The matching data MM is used for map matching processing for correcting the displayed information to locate a mark representing the vehicle on a road, when the travel progress of the vehicle is superposed on the map information. This processing prevents such errors in which the mark representing the vehicle is displayed on a building instead of the road. The matching data MM has plural pieces of link string block information.

As shown in FIG. 3, the link string block information is a data structured in a table so that a plurality of links L are mutually associated according to a predetermined rule. The link L as segment information represents a road and connects nodes N as the point information. Specifically, the links L each corresponding to a predetermined length of a road are mutually connected to form polygonal lines (i.e. link strings), which represent continuous roads such as Koshu street and Ome street. Each link L has segment-specific information (hereafter referred to as a link ID) as a unique number assigned to each link L, and node information as a unique number indicating two nodes N connected by the link L. Each link L is associated with a VICS link to match the positional relationship between the VICS data and the displayed map.

Each node N represents a joint point such as an intersection, a corner, a fork, a junction or the like of each road. Information about the node N has point-specific information as a unique number assigned to each node N in the link string block information, coordinate information of the position where each node N is located, and flag information as branching information describing whether or not the node N represents a branching position (e.g. intersection, fork) where a plurality of links are crossed. Some nodes N only have the point-specific information and the coordinate information without the flag information for simply representing the shape of a road, and some nodes N additionally have attribute information representing the road structure such as width of a tunnel or a road. The nodes N without the flag information for simply representing the road shapes are not used when a coordinate matching section 186 (which will be described later) identifies a point.

The route-search map information is structured in a table, which is similar to that of the matching data MM, including point information for representing points such as the nodes N for representing roads, and segment information for connecting points such as the links L. The information is so structured to represent roads for searching for a travel route.

The traffic-jam prediction table 10, which includes statistical traffic information obtained by statistically processing the past traffic conditions based on time factors, is a data group for showing traffic conditions in the past at an arbitrary spot. The traffic-jam prediction table 10 is used to predict a traffic-jam condition at route search processing and at processing for displaying a map. As shown in FIG. 4, the traffic-jam prediction table 10 is structured in a table storing a plurality of records, each single record containing a date-classification ID (identification) 11, time-series data 12*i* (i representing a natural number) as traffic information and the like.

The date-classification ID 11 is typically an ID number representing a classification of date and day of the week. In the following description, classification of date and day of the week will be referred to as date classification. For example, "ID1" may indicate any "workday" such as Monday to Friday excluding legal holidays; "ID2" may indicate "Saturday" excluding legal holidays; "ID4" may indicate "special day 1" such as a festival day of City A; "ID5" may indicate "special day 2" such as a day when a sports meeting is held at Athletic Ground B; "ID7" may indicate "the day before a long holiday" such as the day before four consecutive holidays; and "ID 11" may indicate "the day before the end of a long holiday" such as the third day of four consecutive holidays. The date-classification ID 11 is not limited to the ID number, but may be text data directly related to a day such as "workday".

The time-series data 12*i* is data on tendency of the traffic-jam condition of the traffic condition. For example, VICS data may be acquired from the VICS and stored for each VICS link, and then statistically processed for every 10 minutes based on the time factor of the stored VICS link (i.e. date classification) so as to be used as the time-series data 12*i*. In other words, the time-series data 12*i* is data representing the traffic-jam condition at desired spots (which might be each VICS link) for every predetermined time, such as the length of the traffic jam, the traffic-jam condition representing the traffic-jam level and the time required for passing through the traffic jam. While the time-series data 12*i* described above is data generated by statistically processing the data for each spot based on the time factor, it may alternatively be generated for each facility, shop, area, city and town, or road.

The storage section 160 typically stores the retrieval information for acquiring information of a predetermined point in the map information. More specifically, the retrieval information includes various information about content and guidance such as names of states, cities and towns, regions and points, which are units used to gradually divide the map information into smaller areas, as well as various information about shops as points. The retrieval information is structured in a tree structure table so that plural pieces of item information are hierarchically associated with each other.

The memory 170 readably stores the settings that are input by the terminal input section 130, music data and image data as well as a plurality of calendar templates 20 as shown in FIG. 5. The memory 170 also stores various programs that run on the OS (Operating System) controlling the whole operation of the navigation device 100. The memory 170 may preferably be a CMOS (Complementary Metal-Oxide Semiconductor) memory that retains the stored data even in the case of, for instance, a sudden power interruption caused by a blackout. The memory 170 may include drives or drivers for readably storing data on a recording medium such as a HD, a DVD, and an optical disc.

The calendar template 20 is a template representing a date classification of each date. More specifically, the calendar template 20 has a table structure storing plural pieces of table data for every month, typically twelve pieces of table data. The respective table data have a plurality of records, each containing date information about date, classification ID numbers associated with respective dates of the date information.

The classification ID number is identical to one of the date-classification IDs 11 in the traffic-jam prediction table 10 and indicates the date classification of the date specified by the date information. For example, Friday 5th is classified as "workday" associated with "ID1", and Monday 15th is classified as "legal holiday" associated with "ID3". The classification ID number of the calendar template 20 can be changed by the processor 180 if necessary. The classification ID number is not limited to numerical values, but may alternatively be text data (e.g. "workday") corresponding to the date-classification ID in the traffic-jam prediction table 10.

Figure 6:
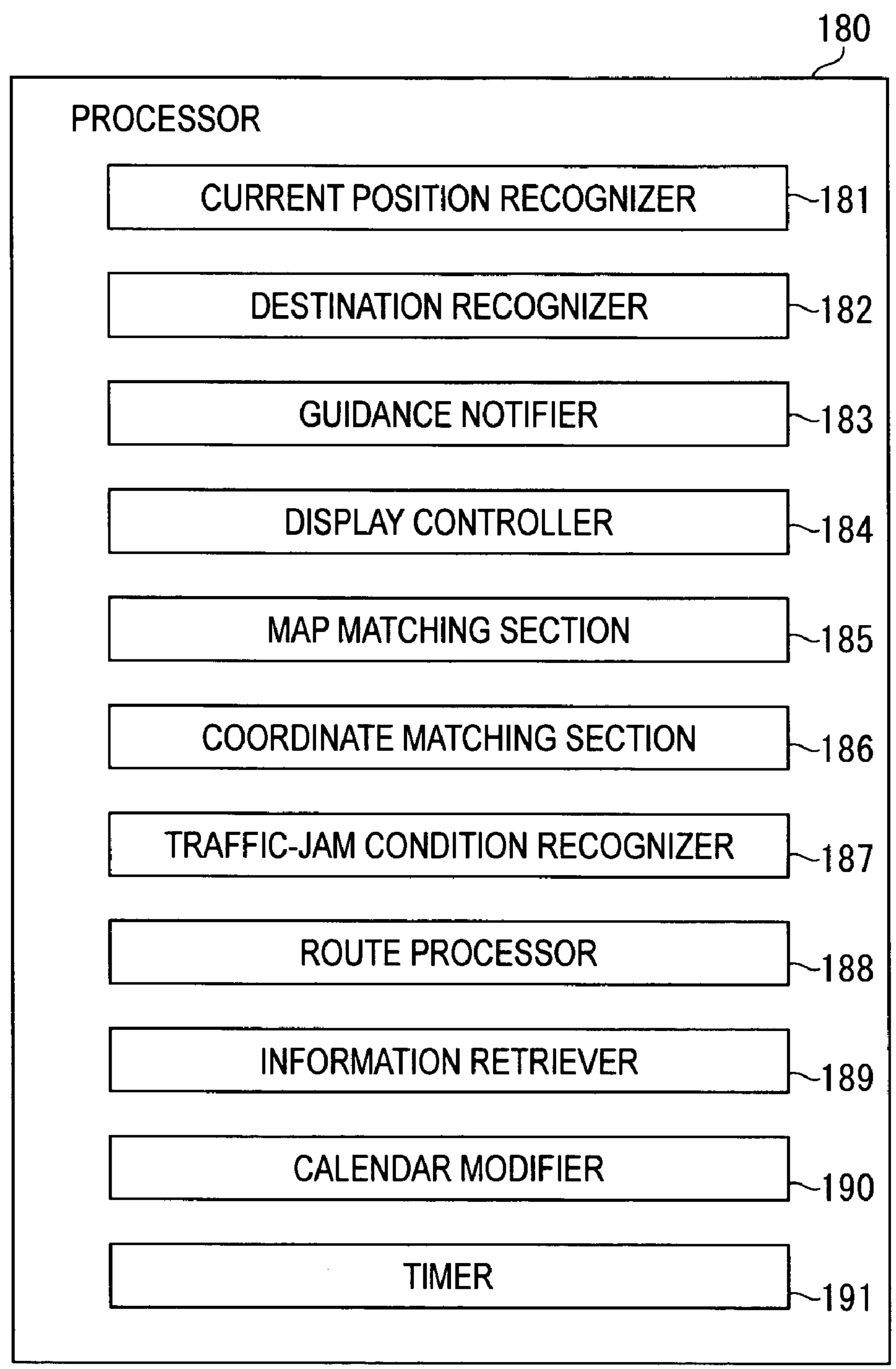
FIG. 6 is a block diagram schematically showing an arrangement of a processor of the navigation device according to the embodiment.

The processor 180 has various input/output ports (not shown) including a VICS receiving port connected to a VICS antenna, a GPS receiving port connected to a GPS receiver, sensor ports respectively connected to various sensors, a key input port connected to the terminal input section 130, a display control port connected to the terminal display section 140, a sound control port connected to the sound output section 150, a storage port connected to the storage section 160 and a memory port connected to the memory 170. As shown in FIG. 6, the processor 180 has various programs such as a current-position recognizer 181 as a current position information acquirer, a destination recognizer 182, a guidance notifier 183, a display controller 184 that also functions as a particular-condition-point direction recognizer and a current-position map information acquirer, a map matching section 185, the coordinate matching section 186, a traffic-jam condition recognizer 187 as a traffic information acquirer that also functions as an area-specifying signal acquirer, a route processor 188, an information retriever 189, a calendar modifier 190, a timer 191 and so on. The sensor 110, the VICS receiver 120, the current-position recognizer 181, the display controller 184 and the traffic-jam condition recognizer 187 form a computing unit of the present invention. Note that the computing unit of the present invention may not include any one of the sensor 110, the VICS receiver 120 and the traffic-jam condition recognizer 187.

The current-position recognizer 181 recognizes the current position of the vehicle. More specifically, the current-position recognizer 181 calculates a plurality of current simulated positions of the vehicle on the basis of the speed data and the azimuth data of the vehicle output respectively from the speed sensor and the azimuth sensor of the sensor 110. The current-position recognizer 181 further recognizes the current simulated coordinate values of the vehicle based on the GPS data on the current position output from the GPS receiver. Then, the current-position recognizer 181 compares the calculated current simulated positions with the recognized current simulated coordinate values, and calculates the current position of the vehicle on map information separately acquired so as to recognize the current position.

The current-position recognizer 181 determines a slope angle and an altitude of a road to drive based on the acceleration data output from the acceleration sensor and calculates the current simulated position of the vehicle so as to recognize the current position. Thus, the current position of the vehicle can be accurately recognized even if the vehicle is on an intersection with an overpass or on an elevated highway where roads are overlaid in a two-dimensional view. Furthermore, when the vehicle runs on a mountain road or a slope, the current-position recognizer 181 corrects the discrepancy between the travel distance obtained based only on the speed data and the azimuth data and the actual travel distance by using the detected slope angle of the road to accurately recognize the current position.

The current-position recognizer 181 can recognize not only the current position of the vehicle as described above but also a departure point, i.e. an initial point set by the terminal input section 130 as the current simulated position. Current position information acquired by the current-position recognizer 181 is appropriately stored in the memory 170.

The destination recognizer 182 typically acquires the destination information about the destination set by the input operation at the terminal input section 130 and recognizes the position of the destination. The destination information to be set includes various information for identifying a spot, which might be coordinates such as latitude and longitude, addresses, telephone numbers and the like. Such destination information recognized by the destination recognizer 182 is appropriately stored in the memory 170.

The guidance notifier 183 notifies guidance stored in the memory 170 by an image display using the terminal display section 140 or by sound using the sound output section 150 based on travel route information and feature guidance information acquired in advance according to the driving status. The guidance is related to the travel of the vehicle, which may be content for assisting the drive of the vehicle. Specifically, a predetermined arrow or a symbol may be displayed in a display window of the terminal display section 140, or guidance such as "Turn right in 700 meters at intersection OOO toward ΔΔΔ", "You have deviated from the travel route" and "Traffic-jam ahead" is output in the audio form from the sound output section 150.

The display controller 184 appropriately controls the terminal display section 140 to display the various information thereon in order to notify the user of the various information. The display controller 184 also controls display of various display windows for prompting the user to operate the terminal input section 130 so as to set various information. The display controller 184 performs a control for displaying a map near the vehicle or information about the traffic-jam condition in a display area 300 of the terminal display section 140 a shown in FIG. 7 in response to a predetermined input operation at the terminal input section 130 or the various signals.

Here, the display area 300 has a substantially rectangular shape. The display area 300 includes a map information display area 310 and a traffic-jam simplified display area 320. Although the display area 300 including the above-described display areas 310, 320 is exemplified, the arrangement is not limited thereto.

The map information display area 310 substantially entirely occupies the display area 300. The map information display area 310 displays current-position map information 311 about an area near the current position. A vehicle icon 312 is displayed in a superposing manner at a position corresponding to the current position of the vehicle in the current-position map information 311. The vehicle icon 312 has, for instance, a substantially isosceles triangle form, an apex of the isosceles triangle indicating a driving direction of the vehicle.

The traffic-jam simplified display area 320 is provided on an upper right portion of the display area 300. A vehicle icon 321 is displayed substantially at the center of the traffic-jam simplified display area 320, the vehicle icon 321 indicating the driving direction of the vehicle. The vehicle icon 321 is displayed in an expression that allows the user to recognize the driving direction of the vehicle, specifically by displaying a steering wheel or a windshield. For example, the display of the vehicle icon 321 shown in FIG. 7 indicates that the driving direction of the vehicle is upward in the traffic-jam simplified display area 320. Note that text data such as "Traveling direction is upward in screen" may be displayed instead of the vehicle icon 321. Traffic-jam direction icons 322*n* (n representing 1 to 9) as direction data are displayed around the vehicle icon 321 in the traffic-jam simplified display area 320. Traffic-jam direction icons 3221, 3222, 3223, 3224, 3225, 3226, 3227, 3228 have arrow marks respectively indicating the upper side, the upper right side, the right side, the lower right side, the lower side, the lower left side, the left side and the upper left side in FIG. 7. The traffic-jam direction icons 3221, 3222, 3223, 3224, 3225, 3226, 3227, 3228 are displayed respectively on the upper side, the upper right side, the right side, the lower right side, the lower side, the lower left side, the left side and the upper left side of the vehicle icon 321 in FIG. 7. That is to say, traffic-jam direction icons 3221, 3222, 3223, 3224, 3225, 3226, 3227, 3228 are displayed in a manner corresponding respectively to the forward side, the diagonally forward right side, the rightward side, the diagonally backward right side, the backward side, the diagonally backward left side, the leftward side and the diagonally forward left side in the driving direction of the vehicle. The traffic-jam direction icons may have text data such as "forward" and "backward" instead of the arrow mark.

Figure 8:
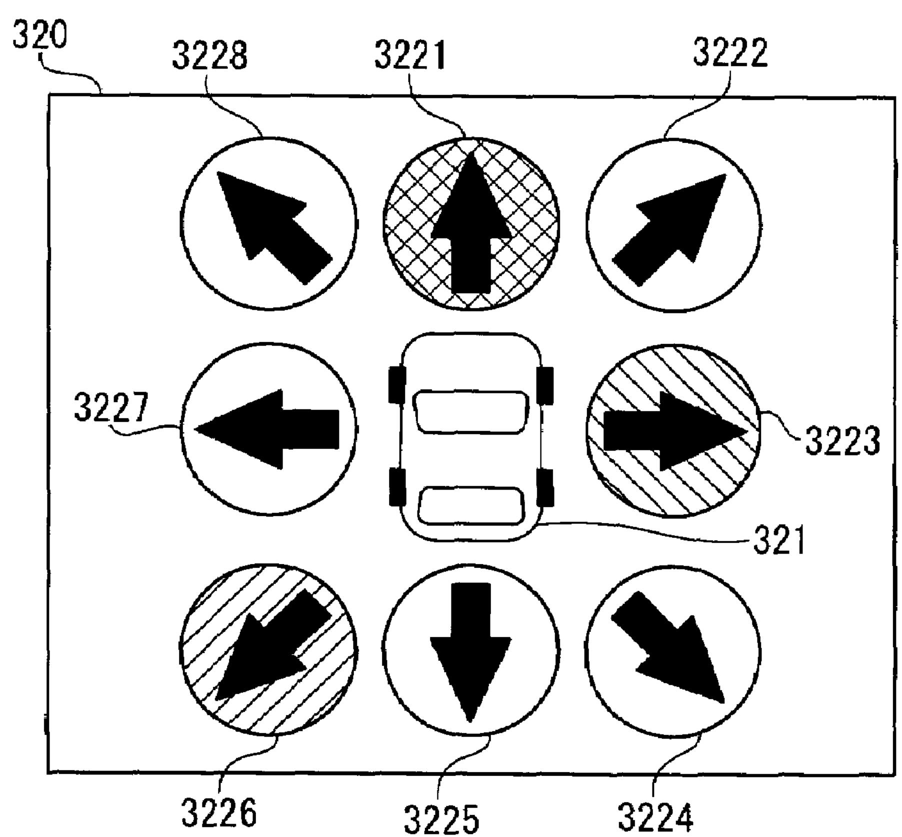
FIG. 8 is a conceptual diagram showing an example of a display window in a traffic-jam simplified display area according to the embodiment.

The display controller 184 sets the expressions of the traffic-jam direction icons 322*n* in accordance with the traffic-jam condition. Specifically, the display controller 184 acquires the driving direction information, the current position information, traffic-jam-condition recognition region information and at least one of later-described current traffic-jam information and predicted traffic-jam information. Further, the display controller 184 retrieves and acquires from the storage section 160 map information of an area containing a traffic-jam-condition recognition region based on the current position information and the traffic-jam-condition recognition region information. Then, based on the acquired various information, when recognizing that a traffic jam is currently occurring at, for instance, a point corresponding to the forward side in the driving direction, the display controller 184 sets the expression of the traffic-jam direction icon 3221 to a current traffic-jam expression as shown in FIG. 8. The current traffic-jam expression may be so arranged as to display the background of the arrow mark in red, but the arrangement is not limited thereto.

When recognizing that a traffic jam is predicted to occur at, for instance, a point corresponding to the rightward side in the driving direction, the display controller 184 sets the expression of the traffic-jam direction icon 3223 to a predicted traffic-jam expression as shown in FIG. 8. The predicted traffic-jam expression may be so arranged as to display the background of the arrow mark in yellow, but the arrangement is not limited thereto. When recognizing that a traffic jam is currently occurring and the traffic jam is predicted to continue at, for instance, a point corresponding to the diagonally backward left side in the driving direction, the display controller 184 sets the expression of the traffic-jam direction icon 3226 to a continuous traffic-jam expression as shown in FIG. 8. The continuous traffic-jam expression may be so arranged as to display the background of the arrow mark in orange, but the arrangement is not limited thereto. When recognizing that a traffic jam is not currently occurring and is not predicted to occur at, for instance, points corresponding to the diagonally forward right side, the diagonally backward right side, backward side, leftward side and diagonally forward left side in the driving direction, the display controller 184 sets the expressions of the traffic-jam direction icons 3222, 3224, 3225, 3227, 3228 to a non traffic-jam expression as shown in FIG. 8. The non traffic-jam expression may be so arranged as to display the background of the arrow mark in white, but the arrangement is not limited thereto. In a case where the display controller 184 can acquire only one of the current traffic-jam information and the predicted traffic-jam information, when recognizing that a traffic jam is not currently occurring or is not predicted to occur at, for instance, a point corresponding to the leftward side in the driving direction based on the driving direction information and the one of the current traffic-jam information and the predicted traffic-jam information, the display controller 184 sets the expression of the traffic-jam direction icon 3227 to the non traffic-jam expression.

Note that although display colors are employed as the expression, the arrangement is not limited thereto. For example, a blinking speed may be employed as the expression. In addition, other arrangements may appropriately employed such as an arrangement in which only the traffic-jam direction icons 3221, 3223, 3225, 3227 corresponding to the forward side, rightward side, backward side and leftward side in the driving direction are displayed.

The map matching section 185 performs the map matching processing for displaying the current position recognized by the current-position recognizer 181 based on the map information obtained from the storage section 160. As described earlier, the map matching section 185 typically uses the matching data MM for performing the map matching processing to modify or correct the current position information to prevent the current position superimposed on the map on the terminal display section 140 from being located off the road in the map on the terminal display section 140.

The coordinate matching section 186 performs the coordinate matching processing for determining whether or not point information about nodes N contained in the matching data MM of the map information acquired from the storage section 160 indicate an identical point. In other words, as described earlier, the coordinate matching section 186 acquires point information of nodes N contained in the matching data MM and reads the coordinate information of the point information. More specifically, the coordinate matching section 186 calculates the coordinate values such as the latitude and the longitude based on the coordinate values of the coordinate information and the offset amount. If different nodes N have identical coordinate values, it reads the flag information of the point information of the nodes N to determine whether the nodes N represent the identical point. If the coordinate matching section 186 determines that the nodes N are identical, it recognizes a road arrangement in which the links L respectively connected to the nodes N and contained in the different link string block information are crossed with each other, and thus considers as, for example, an intersection. If, on the other hand, the coordinate matching section 186 determines that the nodes N are not identical, it recognizes that the links L respectively connected to the nodes N and contained in the different link string block information are not crossed with each other, and thus considers as, for example, a multi-level intersection.

The traffic-jam condition recognizer 187 generates current traffic-jam information about the traffic jam that is currently occurring. Specifically, the traffic-jam condition recognizer 187 acquires the traffic-jam-condition recognition region information as an area-specifying signal that is set by the input operation at the terminal input section 130. Then, the traffic-jam condition recognizer 187 recognizes, based on the traffic-jam-condition recognition region information, that a region of which the traffic-jam condition is to be recognized (hereinafter referred to as a traffic-jam-condition recognition region) is, for instance, a region located in predetermined distance from the current position. Here, the traffic-jam-condition recognition region may be, for instance, a region in which the vehicle can travel in a predetermine time from the current position. The traffic-jam condition recognizer 187 acquires the current position information. The traffic-jam condition recognizer 187 also acquires the VICS data from the VICS output from the VICS receiver 120. Then, the traffic-jam condition recognizer 187 generates current traffic-jam information about the traffic-jam condition as a current traffic condition that occurs in the traffic-jam condition recognition region based on the acquired various information.

The traffic-jam condition recognizer 187 also generates predicted traffic-jam information about the predicted traffic-jam condition that is predicted to occur at an arbitrary spot in the traffic-jam condition recognition region. Specifically, the traffic-jam condition recognizer 187 recognizes the classification ID number of the date for which traffic-jam prediction will be performed on the basis of the time information acquired from the timer 191 and the calendar template 20. Then, the traffic-jam condition recognizer 187 retrieves and acquires the time-series data **12*i* corresponding to the recognized classification ID number and relating to an area containing traffic-jam condition recognition region from the traffic-jam prediction table 10. The traffic-jam condition recognizer 187 generates the predicted traffic-jam information about the predicted traffic-jam condition in the traffic-jam condition recognition region based on the acquired time-series data 12*i* and a current time acquired from the timer 191. The current traffic-jam information and the predicted traffic-jam information generated by the traffic-jam condition recognizer 187 and the acquired traffic-jam-condition recognition region information are stored in the memory 170**.

The route processor 188 searches for a travel route by computing the driving route of the vehicle based on the setting information that is set by the user for setting the route as well as the map information stored in the storage section 160. The route processor 188 can compute the travel route by taking the current traffic-jam information and the predicted traffic-jam information generated by the traffic-jam condition recognizer 187 into consideration when the processor 180 recognizes traffic-jam prediction request information requesting a travel route search with the traffic-jam information and the traffic-jam prediction considered.

More specifically, if the setting information does not contain the traffic-jam prediction request information, the route processor 188 acquires the current position information, the destination information, the setting information and the current traffic-jam information. Then, based on the acquired information, the route processor 188 searches for available roads, where for example traffic is allowed, using the route-search map information of the map information, and generates travel route information for setting a route with a shorter required time, a route with a shorter distance, or a route without traffic jam and traffic controls.

If, on the other hand, the setting information contains the traffic-jam prediction request information, the route processor 188 acquires the current position information, the destination information, the setting information and the current traffic-jam information. Then, based on the acquired information, it generates candidate travel route information for setting a plurality of candidate routes including a candidate route with shorter travel time, with shorter travel distance, or a candidate route without traffic jams and traffic controls. The route processor 188 acquires the predicted traffic-jam information and reduces the number of the candidate routes contained in the candidate travel route information based on the predicted traffic-jam information, and thereby generates travel route information for setting a route etc. The travel route information generated by the route processor 188 is appropriately stored in the memory 170.

In searching for the travel route, the route processor 188 may use the matching data MM of the map information in addition to the route-search map information. This applies to, for instance, a case where the route processor 188 searches for the travel route including a narrow road such as a back street which is not contained in the route-search map information. When the matching data MM is used, the route is appropriately searched for according to the road arrangement recognized by the coordinate matching section 186. The travel route information typically includes route guidance information for navigating the vehicle during the drive thereof for assisting the drive. Under the control of the guidance notifier 183, the route guidance information may be appropriately displayed on the terminal display section 140 or output as sounds from the sound output section 150 to assist the drive.

The information retriever 189 hierarchically retrieves and acquires the retrieval information, such as shops and facilities, stored in the storage section 160 on the basis of the item information in response to, for example, a retrieval request for the retrieval information set at the terminal input section 130.

The calendar modifier 190 appropriately updates the calendar template 20 stored in the memory 170 on the basis of modifications set by the user. More specifically, the calendar modifier 190 recognizes various information set by the input operations of the user at the terminal input section 130. The various information may include date information for specifying date and event information about events such as festivals and sports meeting. Then, the calendar modifier 190 recognizes the date specified by the date information, and also recognizes the classification ID number associated with the event information.

For example, the date classification is determined based on the set event information, and the classification ID number is recognized based on the determined date classification. If, for example, the event information relates to a sports meeting to be held at Stadium B, the date classification is determined as “special day 2”, and the classification ID number is recognized as “ID5” based on the “special day 2”. Then, the calendar modifier 190 appropriately modifies the calendar template 20 on the basis of the recognized date and the classification ID number.

The timer 191 recognizes the current time typically based on the pulse of an internal clock. The timer 191 senses elapsed time from a predetermine time. Then, the timer 191 appropriately outputs time information about the recognized current time.

[Operation of Navigation Device]

Now, simplified display processing for the traffic-jam condition as one of operations of the navigation device 100 will be described with reference to FIG. 9.

Figure 9:
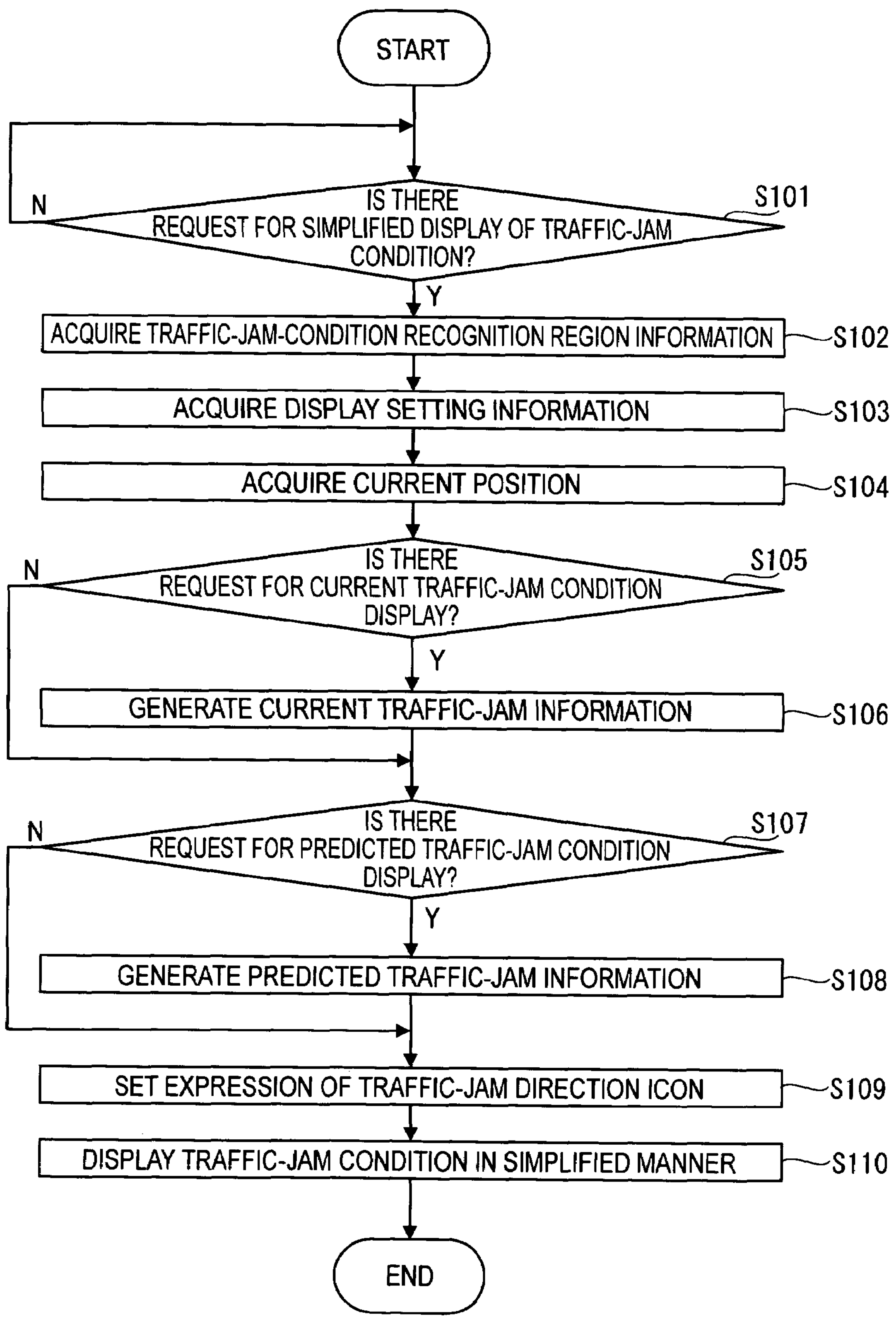
FIG. 9 is a flowchart showing simplified display processing of a traffic-jam condition according to the embodiment.

First, as shown in FIG. 9, the user operates the terminal input section 130 to set a command for performing the simplified display processing for the traffic-jam condition. Based on the set command, a request signal for requesting simplified display of the traffic-jam condition is generated. When the display controller 184 of the processor 180 recognizes the request signal generated based on the set command for performing the simplified display processing for the traffic-jam condition (Step S101), the display controller 184 controls the terminal display section 140 to display a display window for prompting the user to input various items required for the simplified display of the traffic-jam condition such as the traffic-jam-condition recognition region information about the traffic-jam condition recognition region and display setting information for requesting at least one of simplified display of the current traffic-jam condition (hereinafter referred to as a current traffic-jam condition display) and simplified display of the predicted traffic-jam condition that is predicted to occur (hereinafter referred to as a predicted traffic-jam condition display).

The processor 180 operates the traffic-jam condition recognizer 187 to acquire the traffic-jam-condition recognition region information (Step S102) to acquire the display setting information (Step S103). The processor 180 then operates the current position recognizer 181 to recognize the current position (Step S104). Specifically, the current-position recognizer 181 calculates the current position of the vehicle based on the speed data and the azimuth data of the vehicle respectively output from the speed sensor and the azimuth sensor of the sensor 110 and the GPS data about the current position output from the GPS receiver, and acquires the current position information. The acquired traffic-jam-condition recognition region information, the display setting information and the current position information are appropriately stored in the memory 170. Then, the processor 180 operates the traffic-jam condition recognizer 187 to determine whether or not the current traffic-jam condition display is requested based on the display setting information (Step S105).

When recognizing that the current traffic-jam prediction display is requested in Step S105, the traffic-jam condition recognizer 187 acquires the VICS data from the VICS receiver 120. Then, based on the acquired VICS data, the traffic-jam-condition recognition region information and the current position information stored in the memory 170, the traffic-jam condition recognizer 187 generates the current traffic-jam information about the current traffic-jam condition currently occurring in the traffic-jam condition recognition region, namely in a region located in a predetermined distance from the current position (Step S106). The generated current traffic-jam information is appropriately stored in the memory 170.

Then, the traffic-jam condition recognizer 187 determines whether or not the predicted traffic-jam condition display is requested based on the display setting information (Step S107). In Step S107, when recognizing that the predicted traffic-jam condition display is requested, the traffic-jam condition recognizer 187 acquires the time information from the timer 191, the VICS data from the VICS receiver 120 and the time-series data 12*i* from the storage section 160. Then, based on the acquired various information, the traffic-jam condition recognizer 187 generates the predicted traffic-jam information about the predicted traffic-jam condition that is predicted to occur at an arbitrary spot in the traffic-jam condition recognition region (Step S108). The generated predicted traffic-jam information is appropriately stored in the memory 170. The processor 180 then operates the display controller 184 to set the expressions of the traffic-jam direction icons 322*n* based on the driving direction from the sensor 110, the map information of an area containing the traffic-jam condition recognition region stored in the storage section 160, and the current position information, the current traffic-jam information and the predicted traffic-jam information that are stored in the memory 170 (Step S109).

On the other hand, when recognizing that the current traffic-jam prediction display is not requested in Step S105, the traffic-jam condition recognizer 187 performs the processing of Step S107. When the traffic-jam condition recognizer 187 recognizes that the predicted traffic-jam prediction display is not requested in Step S107, the processor 180 operates the display controller 184 to perform the processing of Step S109. Here, when the processing of Step 106 and Step S108 have been performed, namely when the current traffic-jam condition display and the predicted traffic-jam condition display are requested, the display controller 184 sets the expression to one of the current traffic-jam expression, the predicted traffic-jam expression, the continuous traffic-jam expression and the non traffic-jam expression based on the current traffic-jam information and the predicted traffic-jam information in Step S109. When the processing of Step 106 has been performed while the processing of Step S108 has not been performed, namely when only the current traffic-jam condition display is requested, the display controller 184 sets the expression to the current traffic-jam expression or the non traffic-jam expression based on the current traffic-jam information in Step S109. When, on the other hand, the processing of Step 106 has not been performed while the processing of Step S108 has been performed, namely when only the predicted traffic-jam condition display is requested, the display controller 184 sets the expression to the predicted traffic-jam expression or the continuous traffic-jam expression based on the predicted traffic-jam information in Step S109.

Figure 7:
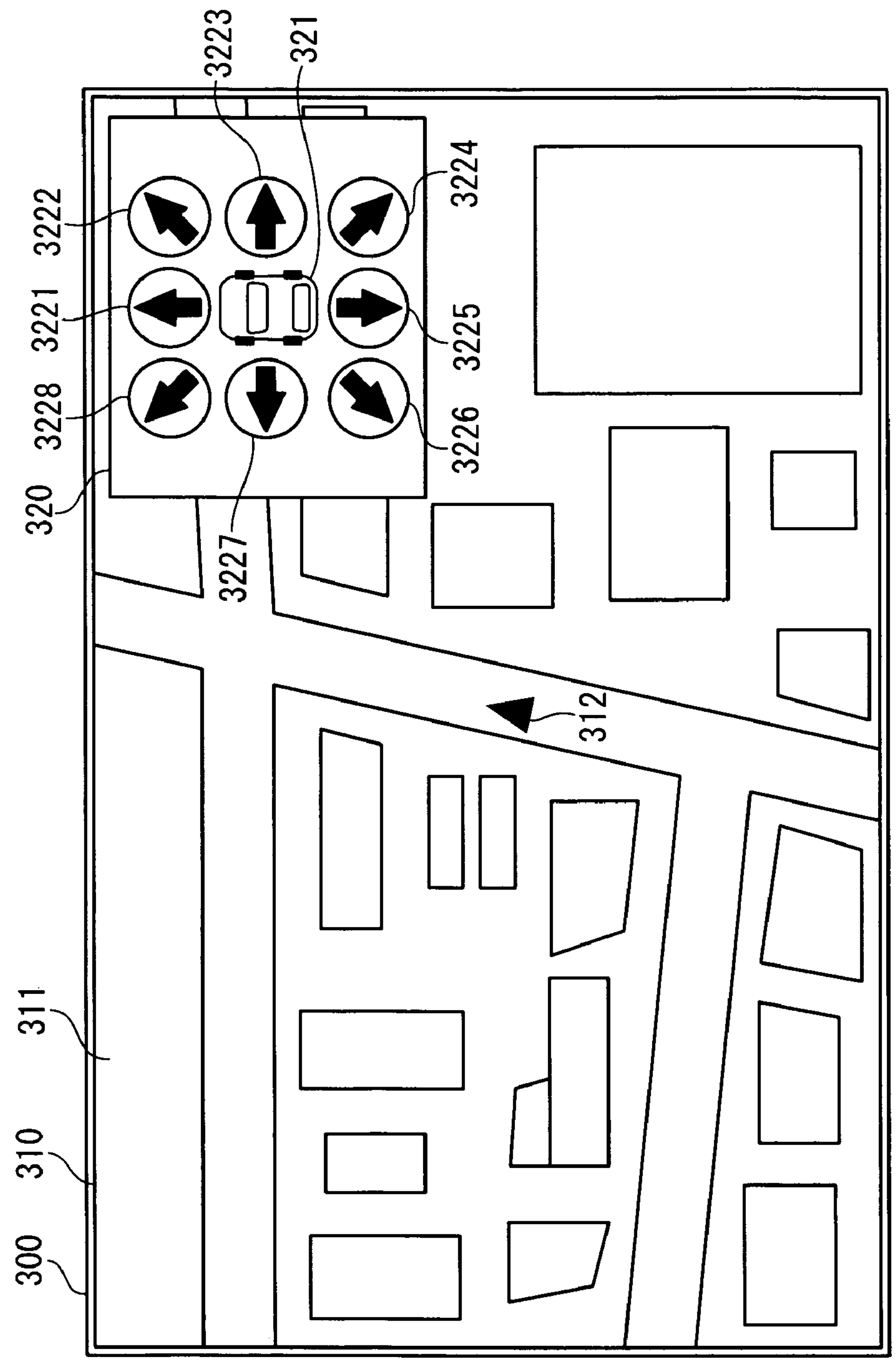
FIG. 7 is a conceptual diagram showing an example of a traffic-jam condition display window according to the embodiment.

Then, the display controller 184 displays the traffic-jam condition in the display area 300 in a simplified manner (Step S110). Specifically, the display controller 184 acquires the map information of an area containing the current position to display it in the map information display area 310 as the current-position map information 311 as shown in FIG. 7. The display controller 184 displays the vehicle icon 312 in a superimposing manner at a position corresponding to the current position in the current-position map information 311 based on the current position information. The display controller 184 displays the vehicle icon 321 in the traffic-jam simplified display area 320 and displays the traffic-jam direction icon 322*n* in the expressions set by the display controller 184, for instance, in the expressions shown in FIG. 8.

[Advantage of Navigation Device]

As described above, the processor 180 of the navigation device 100 operates the current position recognizer 181 to acquire the current position information about the current position of the vehicle. The processor 180 operates the traffic-jam condition recognizer 187 to generate the current traffic-jam information about the current traffic-jam condition based on the VICS data from the VICS receiver 120. The processor 180 then operates the display controller 184 to recognize the direction indicating a point at which the traffic jam is currently occurring relative to the current position based on the current position information and the current traffic-jam information. Thereafter, the display controller 184 displays the recognized direction with the traffic-jam direction icon 322*n*.

The navigation device 100 can display with the traffic-jam direction icon 322*n* the direction of a traffic-jam zone relative to the current position, so that the display can be simplified as compared with a conventional arrangement in which the traffic-jam zone is indicated by displaying traffic-jam direction marks near a road in the map information. Accordingly, the user can recognize the information about the traffic jam more easily from the display that is simplified compared with the conventional arrangement. Therefore, the navigation device 100 can display the traffic condition properly, thereby providing proper navigation.

The traffic-jam condition recognizer generates the predicted traffic-jam information about the predicted traffic-jam condition that is predicted to occur at an arbitrary spot based on the time-series data 12*i* stored in the storage section 160. Then, the display controller 184 displays the traffic-jam direction icon 322*n* corresponding to a direction indicating a point at which the traffic-jam is predicted to occur in the predicted traffic-jam expression based on the predicted traffic-jam information. The display controller 184 displays the traffic-jam direction icon 322*n* corresponding to a direction indicating a point at which the traffic jam is currently occurring in the current traffic-jam expression that is different from the predicted traffic-jam expression. With the arrangement, the expression of the traffic-jam direction icon 322*n* allows the user to distinguish the direction indicating the point at which the traffic jam is currently occurring from the direction indicating the point at which the traffic jam is predicted to occur. Accordingly, the navigation device 100 can display the traffic condition more properly.

The display controller 184 displays the traffic-jam direction icons 322*n* having arrow marks indicating different directions from one another. By setting the expression of the traffic-jam direction icon 322*n* to the current traffic-jam expression, the direction indicating the point at which the traffic jam is currently occurring can be displayed. With the arrangement, for instance, the user can recognize the direction indicating the point at which the traffic jam is currently occurring with the traffic-jam direction icon 322*n* that is set to the current traffic-jam expression and recognize the direction indicating the point at which the traffic jam is not occurring with the traffic-jam direction icon 322*n* that is not set to the current traffic-jam expression. Accordingly, the navigation device 100 can display the traffic condition more properly.

The display controller 184 sets the display color of the expression of the traffic-jam direction icon 322*n* in accordance with the traffic-jam condition. With the arrangement, the user can recognize that the traffic jam is occurring at the point corresponding to the forward side in the driving direction by, for instance, the traffic-jam direction icon 3221 that is displayed in a display color different from that of the traffic-jam direction icon 3227 corresponding to the point at which a traffic jam is not occurring. Accordingly, the navigation device 100 can display the traffic condition more properly.

The display controller 184 displays the current-position map information 311 in the map information display area 310 of the display area 300 and the traffic-jam direction icon 322*n* in the traffic-jam simplified display area 320. With the arrangement, the user can recognize information about the point containing the current position in addition to the information about the traffic jam. In addition, the user can recognize with the traffic-jam direction icon 322*n* the direction indicating the point at which the traffic-jam is currently occurring even when the user enlarges the display until the point at which the traffic jam is currently occurring is positioned out of the region indicated by the current-position map information 311. Accordingly, user-friendliness of the navigation device 100 can be enhanced.

The display controller 184 acquires the driving direction information from the sensor 110. Then, when recognizing that, for instance, the traffic jam is currently occurring at the point corresponding to the forward side in the driving direction of the vehicle based on the driving direction information and the current traffic-jam information, the display controller 184 reflects the recognized traffic jam to the traffic-jam direction icon 3221 corresponding to the forward side in the driving direction. Accordingly, since the user can recognize a direction indicating a point at which the traffic jam is currently occurring relative to the driving direction, the user can recognize the direction of the traffic jam more easily as compared to the arrangement in which the direction of the traffic jam is displayed relative to the current position. Therefore, the navigation device 100 can display the traffic condition more properly.

The traffic-jam condition recognizer 187 acquires the traffic-jam-condition recognition region information and recognizes that a region of which the traffic-jam condition is to be recognized (i.e. traffic-jam-condition recognition region) is, for instance, in a predetermined distance from the current position. In addition, the traffic-jam condition recognizer 187 generates the current traffic-jam information about the current traffic jam condition currently occurring in the traffic-jam condition recognition region based on the VICS data. The display controller 184 then displays the direction indicating the point at which the traffic jam is currently occurring with the traffic-jam direction icon 322*n* based on the current traffic-jam information corresponding to the traffic-jam condition recognition region. With the arrangement, the user recognizes information about the traffic-jam condition for regions depending on a traveling purpose, a traveling distance or the like. Accordingly, the navigation device 100 can display the traffic condition more properly.

Modification of Embodiment

The present invention is not limited to the above specific embodiment, but includes modifications as long as the object of the present invention can be attained.

The display controller 184 may set the expression of the traffic-jam direction icon 322*n* based only on one of the current traffic-jam information and the predicted traffic-jam information generated by the traffic-jam condition recognizer 187. With the arrangement, the traffic-jam condition recognizer 187 does not need to have a function for generating the other one of the current traffic-jam information and the predicted traffic-jam information. Accordingly, the traffic-jam condition recognizer 187 can be simplified, so that the cost of the navigation device 100 can be reduced.

Although the display controller 184 sets different expressions for the traffic-jam direction icon 322*n* corresponding to the direction indicating the point at which the traffic jam is currently occurring and the traffic-jam direction icon 322*n* corresponding to the direction indicating the point at which the traffic jam is predicted to occur, the display controller 184 may alternatively set a uniform expression for these traffic-jam direction icons 322*n*. Even with the arrangement, the user can recognize the information about the traffic jam more easily from the display that is simplified compared to the conventional arrangement. Also, since the display controller 184 does not need to have a function for setting the expressions of traffic-jam direction icons 322*n* in accordance with the traffic-jam condition, the display controller 184 can be simplified. Accordingly, the cost of the navigation device 100 can be reduced.

It may be so arranged that the display controller 184 recognizes a time and date on which a traffic jam is predicted to occur based on the predicted traffic-jam information and sets the expression of the traffic-jam direction icon 322*n* in accordance with the time and date. For example, a background of a traffic-jam direction icon 322*n* corresponding to a point at which a traffic jam is predicted to occur in one hour is set to red, while a background of a traffic-jam direction icon 322*n* corresponding to a point at which a traffic jam is predicted to occur in two hours is set to pink. With the arrangement, the user can recognize, from the traffic-jam direction icon 322*n*, the time and date on which the traffic-jam is predicted to occur in addition to the direction indicating the point at which the traffic-jam is predicted to occur. Accordingly, the navigation device 100 can display the traffic condition more properly.

Figure 10:
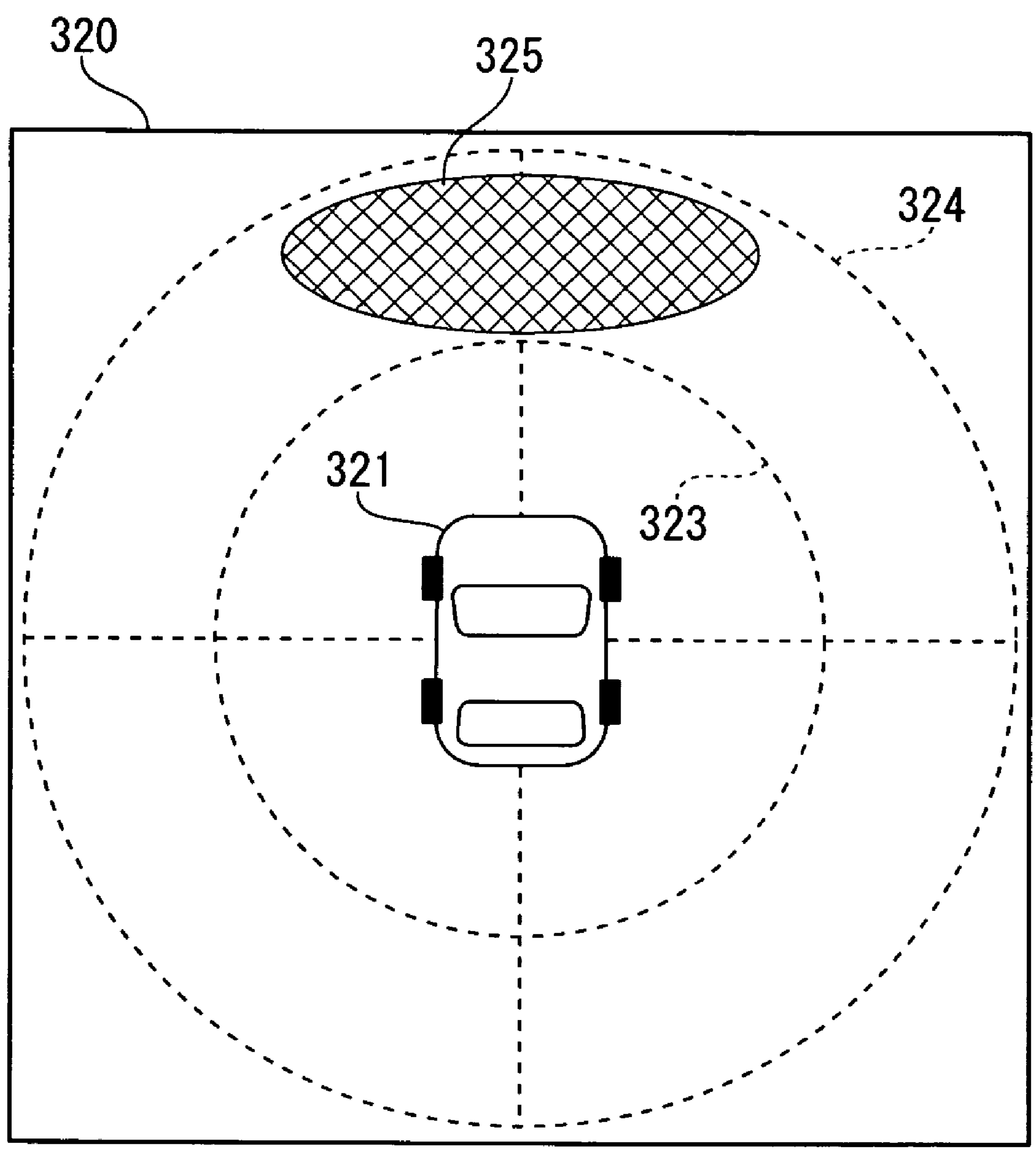
FIG. 10 is a conceptual diagram showing an example of a display window in a traffic-jam simplified display area according to another embodiment of the present invention.

The traffic-jam simplified display area 320 may display various information as shown in FIG. 10. Specifically, a substantially circular map display area circumference line 323 that defines an outer circumference of a region indicated by the current-position map information 311 is displayed around the vehicle icon 321 displayed in the traffic-jam simplified display area 320 In addition, a substantially circular traffic-jam-condition recognition region circumference line 324 that defines an outer circumference of the traffic-jam condition recognition region around the map display area circumference line 323. For example, when it is recognized that a traffic jam is currently occurring at a point corresponding to the forward side in the driving direction and positioned out of the current-position map information 311, a substantially ellipsoidal traffic-jam direction mark 325 of which display color is set to red for instance may be displayed in a region positioned between the circumference lines 323, 324 and corresponding to the forward side in the driving direction. With the arrangement, the user can recognize information about the traffic jam more easily from more simplified display as compared to the above-described embodiment in which all the traffic-jam direction icons 322*n* are constantly displayed. Accordingly, the navigation device 100 can display the traffic condition more properly.

Figure 11:
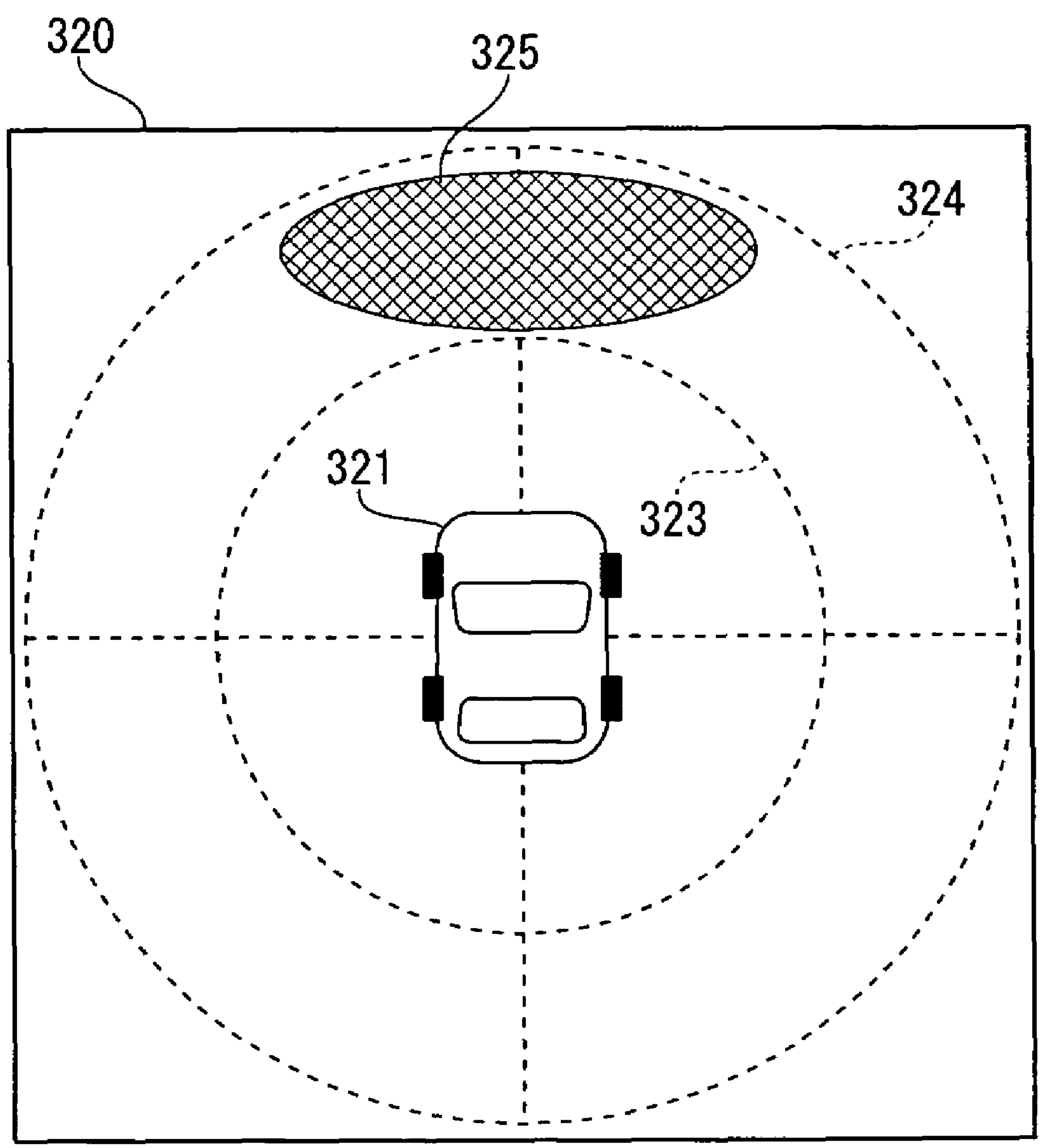
FIG. 11 is a conceptual diagram showing the example of the display window in the traffic-jam simplified display area according to the another embodiment of the present invention.

It may be so arranged that expressions of the various information in the traffic-jam simplified display area 320 are set by reflecting information about the traffic-jam level contained in the VICS data or the time-series data 12*i*. Specifically, when it is recognized that that the traffic-jam level is "heavy traffic" which is lower than "traffic-jammed" based on the current traffic-jam information, the display color of the traffic-jam direction mark 325 is set to red as shown in FIG. 10. When it is recognized the traffic-jam level is "traffic-jammed", the display color of the traffic-jam direction mark 325 is set to dark red which is darker than the display color of the traffic-jam direction mark 325 for "heavy traffic" as shown in FIG. 11. Note that although the expressions may be set using color densities of the display color that depends on the traffic-jam level in the example above, the arrangement is not limited thereto. For example, the expressions may be set using blinking speeds of the traffic-jam direction mark 325. Similarly, the expression of the traffic-jam direction icon 322$n$ of the above-described embodiment may also be set by reflecting the traffic-jam level. With the arrangement, the user can recognize the traffic-jam level by the display in the traffic-jam simplified display area 320 in addition to the direction indicating the point at which the traffic-jam is occurring. Accordingly, the navigation device 100 can display the traffic condition more properly.

The display controller 184 may display only the traffic-jam direction icon 322$n$ corresponding to the point at which the traffic jam is currently occurring and the point at which the traffic jam is predicted to occur. With the arrangement, the user can recognize information about the traffic jam more easily from more simplified display compared to the above-described embodiment in which the traffic-jam direction icons 322$n$ are displayed regardless of the traffic-jam condition. Accordingly, the navigation device 100 can display the traffic condition more properly.

The display controller 184 may set a display size of the traffic-jam direction icon 322$n$ in accordance with the traffic-jam condition, e.g., whether or not the traffic jam is occurring and the traffic jam level. With the arrangement, the user can recognize the information about the traffic jam more easily from the display size that is more distinguishable than the display color. Accordingly, the navigation device 100 can display the traffic condition more properly.

The display area 300 may not display the current-position map information 311. With the arrangement, the size of the traffic-jam simplified display area 320 can be increased, so that the navigation device 100 can display the traffic-jam direction icon 322$n$ with a larger size. Accordingly, the navigation device 100 can allow the user to recognize the information about the traffic jam more easily as compared to the above-described embodiment, thereby displaying the traffic condition more properly.

The traffic-jam simplified display area 320 may not be provided in the display area 300. Instead, for instance, the traffic-jam direction mark 325 as shown in FIG. 10 may be displayed at a position corresponding to the direction indicating the point at which the traffic jam is currently occurring in a region shown by the current-position map information 311. With the arrangement, the user can recognize the direction indicating the point at which the traffic jam is currently occurring in accordance with the region shown by the current-position map information 311. Accordingly, the navigation device 100 can display the traffic condition more properly.

Figure 12:
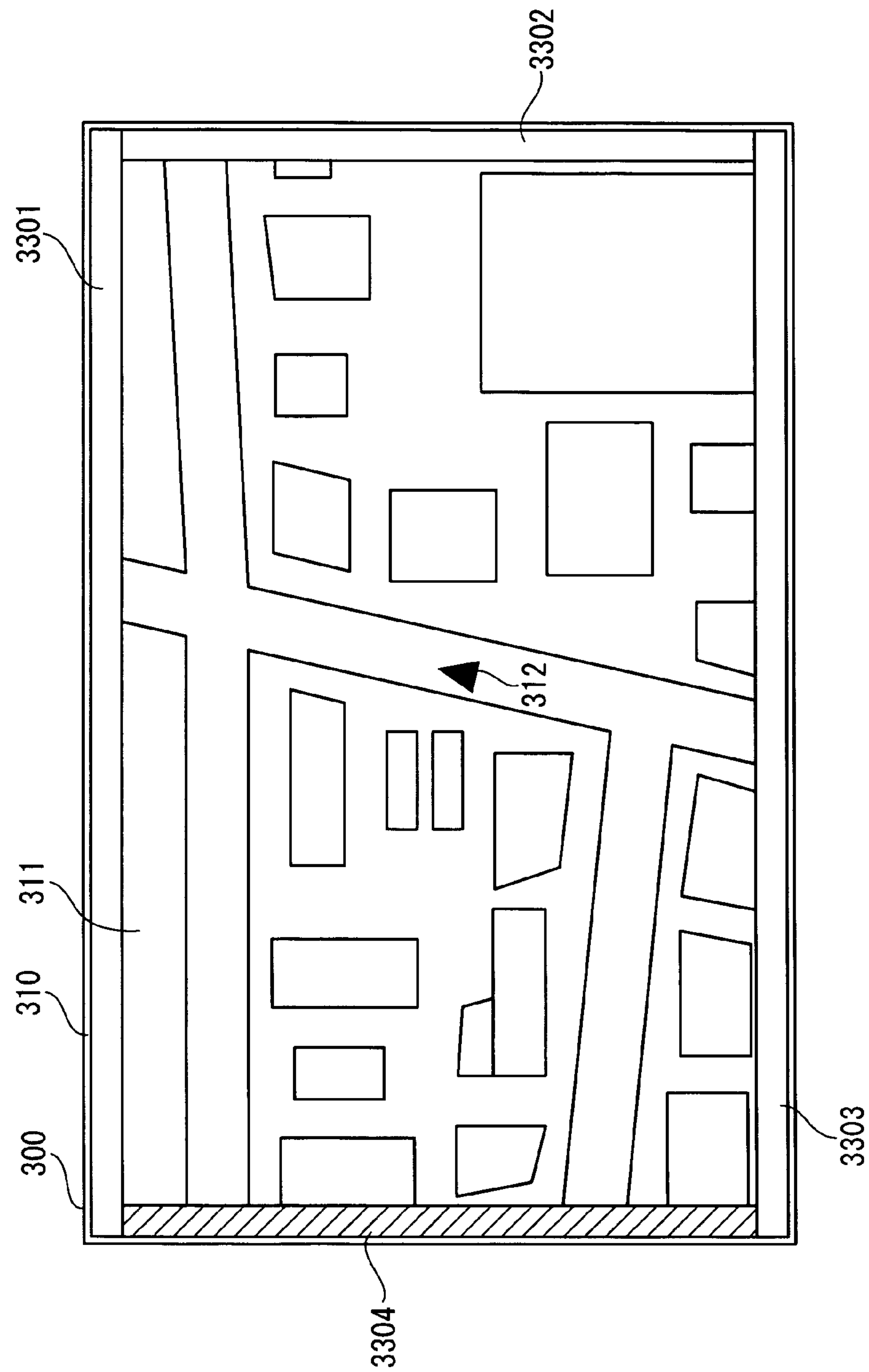
FIG. 12 is a conceptual diagram showing an example of a traffic-jam condition display window according to a still another embodiment of the present invention.

The display area 300 may not display the traffic-jam simplified display area 320. Instead, various information as shown in FIG. 12 may be displayed. Specifically, traffic-jam direction display areas 3301, 3302, 3303, 3304 as direction data having substantially long rectangular shapes are provided respectively along an upper side, a right side, a lower side and a left side of the display area 300. Then, when recognizing that, for instance, a traffic jam is predicted to occur at a point corresponding to the leftward side in the driving direction, the display controller 184 sets the display color of the traffic-jam direction display area 3304 to yellow. With the arrangement, the user can recognize the direction indicating the point at which the traffic jam is currently occurring based on the region shown by the current-position map information 311. In addition, the traffic-jam direction display area 330$t$ is larger and simpler than the traffic-jam direction icon 322$n$, so that the traffic-jam condition can be recognized more easily. Accordingly, the navigation device 100 can display the traffic condition more properly. The traffic-jam direction display area 330$t$ is provided on a circumferential portion of the display area 300. With the arrangement, the current-position map information 311 can be displayed more properly as compared to the above-described embodiment in which the traffic-jam simplified display area 320 is provided in a plane of the map information display area 310. In addition, by arranging such that the traffic-jam direction display area 300$t$ corresponding to a point at which a traffic jam is not currently occurring or a point at which a traffic jam is not predicted to occur is not displayed, the user can recognize the information about the traffic jam more easily from simplified display.

Figure 13:
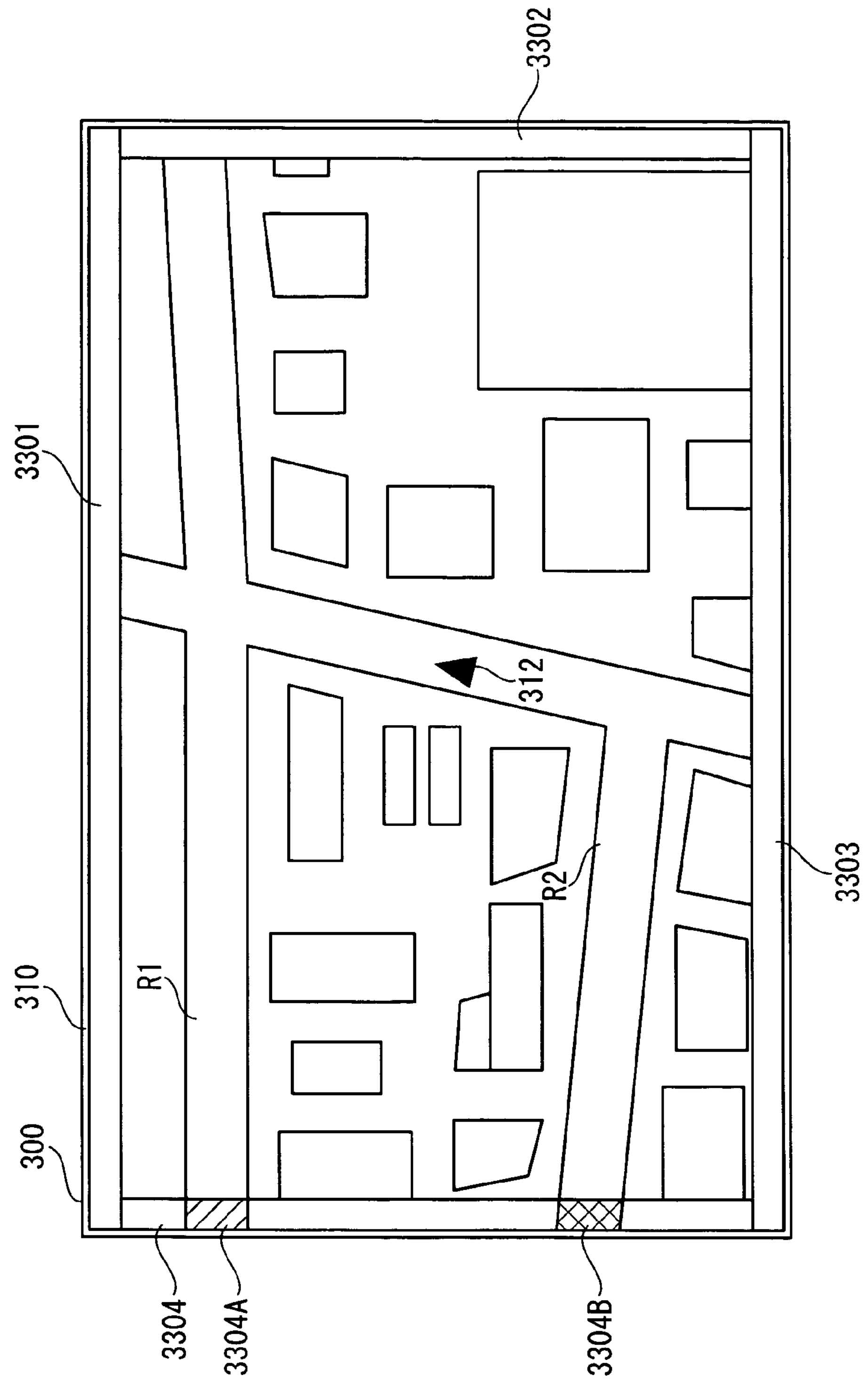
FIG. 13 is a conceptual diagram showing an example of the traffic-jam condition display window according to the still another of the present invention.

In the arrangement in which the traffic-jam direction display areas 330$t$ as shown in FIG. 12 are provided in the display area 300, expressions of the traffic-jam direction display area 330$t$ may be set as shown in FIG. 13. Specifically, for example, when it is recognized that a point positioned on the leftward side relative to a road R1 of the current-position map information 311 is a point at which the traffic jam is predicted to occur, an expression of an area 3304A that is continued to the road R1 in the traffic-jam direction display area 3304 is set to yellow. When, for example, it is recognized that a road that is continued to a road R2 currently has a traffic jam, an expression of an area 3304B that is continued to the road R2 in the traffic-jam direction display area 3304 is set to red. With the arrangement, the user can recognize to which road in the current-position map information 311 the road currently having the traffic jam is continued. Accordingly, the navigation device 100 can display the traffic condition more properly.

The traffic-jam condition recognizer 187 may not be provided with a function for acquiring the traffic-jam-condition recognition region information to recognize the traffic-jam condition recognition region, but may generate the predicted traffic-jam information about a preset region that is in a predetermined distance from the current position. With the arrangement, the user does not have to input the traffic-jam-condition recognition region information every time the simplified display processing for the traffic-jam condition is performed. Accordingly, the user-friendliness of the navigation device 100 can be enhanced.

Although the arrangement in which the display controller 184 has a function for recognizing the direction indicating the point at which the traffic jam is currently occurring relative to the driving direction of the vehicle based on the driving direction information from the sensor 110 is exemplified, the display controller 184 may not have such function. By omitting such function, the display controller 184 can be simplified. Accordingly, the cost of the navigation device 100 can be reduced. In addition, the display controller 184 can only recognize the direction indicating the point at which the traffic jam is currently occurring relative to the current position, setting of the expression of the traffic-jam direction icon 322$n$ becomes less time-consuming, thereby displaying the traffic condition more quickly.

It may be so arranged that the destination recognizer 182 functions as the destination information acquirer of the present invention and the route processor 188 functions as the map information acquirer and the travel route setting section of the present invention so that the destination recognizer 182 and the route processor 188 perform processing as described below. Specifically, the display controller 184 acquires the travel route information containing the travel route generated by the route processor 188. The display controller 184 further recognizes the point at which the traffic jam is predicted to occur in the travel route of the candidate travel route information based on the predicted traffic-jam information. Then, the direction indicating the point at which the traffic jam is predicted to occur relative to the driving direction is displayed with the traffic-jam direction icon 322$n$. With the arrangement, the user can recognize that the point at which the traffic jam is predicted to occur is contained in the travel route set by the navigation device 100. Accordingly, the navigation device 100 can display the traffic condition more properly.

In the arrangement in which the direction indicating the point at which the traffic jam is predicted to occur in the travel route is displayed, the travel route and the map information containing the travel route may be displayed in, for instance, the map information display area 310. With the arrangement, the user can recognize information about the point near the travel route in addition to the information about the traffic jam in the travel route. Accordingly, user-friendliness of the navigation device 100 can be enhanced.

It may be so arranged that the display controller 184 functions as a direction selecting signal acquirer of the present invention so that the display controller 184 performs processing as described below. Specifically, the display controller 184 displays a selection command icon (not shown) that is movable in the display area 300 in response to the input operation at the terminal input section 130. When recognizing that a direction selecting signal for selecting any one of the traffic-jam direction icons 322*n* is input, the display controller 184 displays detailed information of a traffic jam at a point corresponding to the direction of the traffic-jam direction icon 322*n* selected by the direction selecting signal in the map information display area 310 or in the traffic-jam simplified display area 320. Here, the detailed information of the traffic jam may include a head position of the traffic jam and the length of the traffic jam, but the arrangement is not limited thereto. With the arrangement, the user can properly recognize the detailed information of the traffic jam at the point at which the traffic jam is currently occurring or predicted to occur. Accordingly, the navigation device 100 can display the traffic condition more properly.

It may be so arranged that the display controller 184 functions as the direction selecting signal acquirer and a particular-condition-point map information acquirer of the present invention so that the display controller 184 performs processing as described below. Specifically, the display controller 184 acquires map information near a point corresponding to the direction of the traffic-jam direction icon 322*n* selected by the direction selecting signal to display the acquired map information as the particular-condition-point map information in the map information display area 310 or in the traffic-jam simplified display area 320. With the arrangement, the user can properly recognize the point at which the traffic jam is currently occurring or predicted to occur from the particular-condition-point map information. Accordingly, the navigation device 100 can display the traffic condition more properly.

While the functions described above are realized in the form of programs in the above description, the functions may be realized in any form including hardware such as a circuit board or elements such as IC (Integrated Circuit). In view of easy handling and promotion of the use, the functions are preferably stored and read from programs or storage media.

The specific structures and the operating procedures for the present invention may be appropriately modified as long as the object of the present invention can be achieved.

Advantage of Embodiment

As described above, the processor 180 of the navigation device 100 operates the current position recognizer 181 to acquire the current position information about the current position of the vehicle. The processor 180 then operates the traffic-jam condition recognizer 187 to generate the current traffic-jam information about the current traffic-jam condition based on the VICS data from the VICS receiver 120. The processor 180 then operates the display controller 184 to display with the traffic-jam direction icon 322*n* the direction indicating the point at which the traffic jam is currently occurring relative to the current position based on the current position information and the current traffic-jam information.

The navigation device 100 can display with the traffic-jam direction icon 322*n* the direction of a traffic-jam zone relative to the driving direction of the vehicle, so that the display can be simplified as compared with a conventional arrangement in which the traffic-jam zone is indicated by displaying traffic-jam direction marks near a road in the map information. Accordingly, the navigation device 100 can display the traffic condition more properly.

INDUSTRIAL APPLICABILITY

The present invention is applicable to a traffic-condition display device for displaying map information on a display unit in accordance with travel of a mobile body, its method, its program, and a recording medium storing the program.

The invention claimed is:

1. A traffic-condition display device, comprising:

a current position information acquirer for acquiring current position information about a current position of a mobile body;

a traffic information acquirer for acquiring traffic information about a traffic condition;

a particular-condition-point direction recognizer for recognizing a direction indicating a point in a particular traffic condition relative to the current position; and a display controller for displaying plural pieces of direction data indicating directions different from one another on a display unit, the display controller displaying one of the plural pieces of direction data corresponding to the direction indicating the point in the particular traffic condition in a format different from formats of the other pieces of direction data and corresponding to a time and date at which the particular traffic condition arises.

2. The traffic-condition display device according to claim 1, wherein the content of the particular traffic condition is a traffic density.

3. The traffic-condition display device according to claim 1, wherein the format is at least one of brightness, color phase and intensity.

4. The traffic-condition display device according to claim 1, wherein the format is a display size.

5. The traffic-condition display device according to claim 1, wherein the format is at least one of brightness, color phase and intensity.

6. The traffic-condition display device according to claim 1, wherein the format is a display size.

7. The traffic-condition display device according to claim 1, further comprising:

a current-position map information acquirer for acquiring current-position map information about an area containing the current position, wherein the display controller performs control to display the direction indicating the point in the particular traffic condition relative to the current position and the current-position map information in a display area of the display unit.

8. The traffic-condition display device according to claim 7, wherein the display controller performs control to display the direction indicating the point in the particular traffic condition relative to the current position at a position corresponding to the direction indicating the point in the particular traffic condition relative to the current position in the area of the current-position map information.

9. The traffic-condition display device according to claim 8, wherein the display controller performs control to display the direction indicating the point in the particular traffic condition relative to the current position on a circumference of the display area.

10. The traffic-condition display device according to claim 1, wherein the particular-condition-point direction recognizer recognizes the direction indicating the point in the particular traffic condition relative to the current position in a predetermined area.

11. The traffic-condition display device according to claim 1, further comprising:

a travel direction recognizer for recognizing a travel direction of the mobile body from the current position, wherein the particular-condition-point direction recognizer recognizes the direction indicating the point in the particular traffic condition relative to the travel direction from the current position, and the display controller performs control to display the direction indicating the point in the particular traffic condition relative to the travel direction on the display unit.

12. The traffic-condition display device according to claim 11, further comprising:

a destination information acquirer for acquiring destination information about a position of a destination to which the mobile body travels;

a map information acquirer for acquiring map information; and a travel route setting section for setting a travel route from the current position to the destination based on the current position information, the destination information and the map information, wherein the display controller performs control to display the direction indicating the point in the particular traffic condition relative to the travel direction in the travel route.

13. The traffic-condition display device according to claim 12, wherein the display controller performs control to display the map information and the travel route on the display unit.

14. The traffic-condition display device according claim 1, further comprising:

an area-specifying signal acquirer for acquiring an area-specifying signal in accordance with input operation for setting a command to recognize the direction indicating the point in the particular traffic condition relative to the current position in a specified area, and the particular-condition-point direction recognizer recognizes the direction indicating the point in the particular traffic condition relative to the current position in the particular area contained in the area-specifying signal.

15. The traffic-condition device according to claim 1, further comprising:

a direction selecting signal acquirer for acquiring a direction selecting signal in accordance with input operation for setting a command to select display of the direction indicating the point in the particular traffic condition relative to the current position which is displayed on the display unit, wherein the display controller performs control to display on the display unit the content of the particular traffic condition of the point that is indicated by the direction selected by the direction selecting signal.

16. The traffic-condition device according to claim 1, further comprising:

a direction selecting signal acquirer for acquiring a direction selecting signal in accordance with input operation for setting a command to select display of the direction indicating the point in the particular traffic condition relative to the current position which is displayed on the display unit; and a particular-condition-point map information acquirer for acquiring particular-condition-point map information about an area containing the point that is indicated by the direction selected by the direction selecting signal, wherein the display controller performs control to display the particular-condition-point map information on the display unit.

17. A traffic-condition display method that is performed by a computing unit for displaying a traffic condition on a display unit, the method comprising:

acquiring current position information about a current position of a mobile body;

acquiring traffic information about a traffic condition;

recognizing a direction indicating a point in a particular traffic condition relative to the current position; and displaying plural pieces of direction data indicating directions different from one another on the display unit, one of the plural pieces of direction data corresponding to the direction indicating the point in the particular traffic condition being displayed in a format different from formats of the other pieces of direction data and corresponding to a time and date at which the particular traffic condition arises.

18. A traffic-condition display program for operating a computing unit as a traffic-condition display device, the program stored in a recording medium in a manner readable by the computing unit, wherein the traffic-condition display device includes:

a current position information acquirer for acquiring current position information about a current position of a mobile body;

a traffic information acquirer for acquiring traffic information about a traffic condition;

a particular-condition-point direction recognizer for recognizing a direction indicating a point in a particular traffic condition relative to the current position; and a display controller for displaying plural pieces of direction data indicating directions different from one another on a display unit, the display controller displaying one of the plural pieces of direction data corresponding to the direction indicating the point in the particular traffic condition in a format different from formats of the other pieces of direction data and corresponding to a time and date at which the particular traffic condition arises.

19. A traffic-condition display program for operating a computing unit to execute a traffic-condition display method for displaying a traffic condition on a display unit, the program stored in a recording medium in a manner readable by the computing unit, wherein the traffic-condition display method includes:

acquiring current position information about a current position of a mobile body;

acquiring traffic information about a traffic condition;

recognizing a direction indicating a point in a particular traffic condition relative to the current position; and displaying plural pieces of direction data indicating directions different from one another on the display unit, one of the plural pieces of direction data corresponding to the direction indicating the point in the particular traffic condition being displayed in a format different from formats of the other pieces of direction data and corresponding to a time and date at which the particular traffic condition arises.

20. A recording medium that stores a traffic-condition display program for operating a computing unit as a traffic-condition display device in a manner readable by the computing unit, wherein the traffic-condition display device includes:

a current position information acquirer for acquiring current position information about a current position of a mobile body;

a traffic information acquirer for acquiring traffic information about a traffic condition;

a particular-condition-point direction recognizer for recognizing a direction indicating a point in a particular traffic condition relative to the current position; and a display controller for displaying plural pieces of direction data indicating directions different from one another on a display unit, the display controller displaying one of the plural pieces of direction data corresponding to the direction indicating the point in the particular traffic condition in a format different from formats of the other pieces of direction data and corresponding to a time and date at which the particular traffic condition arises.

21. A recording medium that stores a traffic-condition display program for operating a computing unit to execute a traffic-condition display method for displaying a traffic condition on a display unit in a manner readable by the computing unit, wherein the traffic-condition display method includes:

acquiring current position information about a current position of a mobile body;

acquiring traffic information about a traffic condition;

recognizing a direction indicating a point in a particular traffic condition relative to the current position; and displaying plural pieces of direction data indicating directions different from one another on the display unit, one of the plural pieces of direction data corresponding to the direction indicating the point in the particular traffic condition being displayed in a format different from formats of the other pieces of direction data and corresponding to a time and date at which the particular traffic condition arises.

* * * * *